United States Patent
Sugita et al.

(10) Patent No.: US 8,773,778 B2
(45) Date of Patent: *Jul. 8, 2014

(54) IMAGE PICKUP APPARATUS ELECTRONIC DEVICE AND IMAGE ABERRATION CONTROL METHOD

(71) Applicant: Kyocera Corporation, Kyoto (JP)

(72) Inventors: Tomoya Sugita, Tokyo (JP); Yusuke Hayashi, Tokyo (JP); Naoto Ohara, Tokyo (JP)

(73) Assignee: KYOCERA Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/835,164

(22) Filed: Mar. 15, 2013

(65) Prior Publication Data

US 2013/0201569 A1 Aug. 8, 2013

Related U.S. Application Data

(63) Continuation of application No. 12/549,566, filed on Aug. 28, 2009.

(30) Foreign Application Priority Data

| Aug. 28, 2008 | (JP) | 2008-220333 |
| Oct. 29, 2008 | (JP) | 2008-278926 |
| Jan. 28, 2009 | (JP) | 2009-016754 |

(51) Int. Cl.
*G01B 9/00* (2006.01)
*G02B 9/08* (2006.01)

(52) U.S. Cl.
USPC .......................................... 359/738

(58) Field of Classification Search
USPC .......................... 359/648, 662, 708, 637, 738
See application file for complete search history.

(56) References Cited

U.S. PATENT DOCUMENTS

| 3,739,089 A | 6/1973 | Latall |
| 5,664,243 A | 9/1997 | Okada et al. |
| 5,748,371 A | 5/1998 | Cathey, Jr. et al. |
| 6,021,005 A | 2/2000 | Cathey, Jr. et al. |
| 6,069,738 A | 5/2000 | Cathey, Jr. et al. |
| 6,148,528 A | 11/2000 | Jackson |
| 6,233,060 B1 | 5/2001 | Shu et al. |

(Continued)

FOREIGN PATENT DOCUMENTS

| JP | S63-229851 A | 9/1988 |
| JP | H03-010380 A | 1/1991 |

(Continued)

OTHER PUBLICATIONS

Office Action dated Mar. 10, 2010 issued for U.S. Appl. No. 11/773,792.

(Continued)

*Primary Examiner* — Alicia M Harrington
(74) *Attorney, Agent, or Firm* — Procopio, Cory, Hargreaves & Savitch LLP

(57) ABSTRACT

An optical system comprising an aberration control optical system is disclosed. An aberration control optical system is operable to produce an image aberration, and an aperture stop is operable to limit a light beam passing through the aberration control optical system. An image pickup device is operable to capture an object image passing through the aberration control optical system, and the aberration control optical system provides inflection points within a diameter of the aperture stop to obtain a depth extending effect.

17 Claims, 33 Drawing Sheets

(56) References Cited

U.S. PATENT DOCUMENTS

| | | |
|---|---|---|
| 6,241,656 B1 | 6/2001 | Suga |
| 6,449,087 B2 | 9/2002 | Ogino |
| 6,525,302 B2 | 2/2003 | Dowski, Jr. et al. |
| 6,606,669 B1 | 8/2003 | Nakagiri |
| 6,642,504 B2 | 11/2003 | Cathey, Jr. |
| 6,984,206 B2 | 1/2006 | Kumei et al. |
| 7,158,660 B2 | 1/2007 | Gee et al. |
| 7,400,393 B2 | 7/2008 | Shibata et al. |
| 7,583,301 B2 | 9/2009 | Sakurai et al. |
| 7,630,584 B2 | 12/2009 | Nose et al. |
| 7,719,772 B2 | 5/2010 | Mann et al. |
| 2002/0118457 A1 | 8/2002 | Dowski |
| 2003/0076514 A1 | 4/2003 | Gallagher et al. |
| 2003/0122926 A1 | 7/2003 | Kumei et al. |
| 2003/0158503 A1 | 8/2003 | Matsumoto |
| 2004/0136605 A1 | 7/2004 | Seger et al. |
| 2004/0190762 A1 | 9/2004 | Dowski et al. |
| 2004/0257677 A1 | 12/2004 | Matsusaka |
| 2005/0128342 A1 | 6/2005 | Izukawa |
| 2006/0012385 A1 | 1/2006 | Tsao et al. |
| 2007/0086674 A1 | 4/2007 | Guan |
| 2007/0140092 A1 | 6/2007 | Frangineas |
| 2007/0268376 A1 | 11/2007 | Yoshikawa et al. |
| 2007/0291152 A1 | 12/2007 | Suekane et al. |
| 2008/0007797 A1 | 1/2008 | Hayashi |
| 2008/0043126 A1 | 2/2008 | Hayashi |
| 2008/0074507 A1 | 3/2008 | Ohara et al. |
| 2008/0081996 A1 | 4/2008 | Grenon et al. |
| 2008/0212168 A1 | 9/2008 | Olmstead et al. |
| 2008/0234984 A1 | 9/2008 | Ortyn et al. |
| 2008/0259275 A1 | 10/2008 | Aoki et al. |
| 2008/0278592 A1 | 11/2008 | Kuno et al. |
| 2008/0285153 A1 | 11/2008 | Nio |

FOREIGN PATENT DOCUMENTS

| | | |
|---|---|---|
| JP | H03-175403 A | 7/1991 |
| JP | H06-130267 A | 5/1994 |
| JP | H08-128923 A | 5/1996 |
| JP | H10-145667 A | 5/1998 |
| JP | H11-261868 A | 9/1999 |
| JP | 2000-050146 A | 2/2000 |
| JP | 2000-098301 A | 7/2000 |
| JP | 2000-266979 A | 9/2000 |
| JP | 2000-275582 A | 10/2000 |
| JP | 2001-257930 A | 9/2001 |
| JP | 2001-346069 A | 12/2001 |
| JP | 2002-027047 A | 1/2002 |
| JP | 2002-127852 A | 5/2002 |
| JP | 2002-221657 A | 9/2002 |
| JP | 2003-185905 A | 7/2003 |
| JP | 2003-235794 A | 8/2003 |
| JP | 2003-244530 A | 8/2003 |
| JP | 2003-248171 A | 9/2003 |
| JP | 2003-262778 A | 9/2003 |
| JP | 2003-283878 A | 10/2003 |
| JP | 2004-037733 A | 2/2004 |
| JP | 2004-147188 A | 5/2004 |
| JP | 2004-153497 A | 5/2004 |
| JP | 2004-264577 A | 9/2004 |
| JP | 2004-328506 A | 11/2004 |
| JP | 2005-326684 A | 11/2004 |
| JP | 2006-139246 A | 1/2006 |
| JP | 2006-049949 A | 2/2006 |
| JP | 2006-094112 A | 4/2006 |
| JP | 2006-154767 A | 6/2006 |
| JP | 2006-308987 A | 11/2006 |
| JP | 2007-060647 A | 3/2007 |
| JP | 2007-300208 A | 11/2007 |
| JP | 2008-017157 A | 1/2008 |
| JP | 2008-035282 A | 2/2008 |
| WO | 2006/022373 A1 | 3/2006 |
| WO | 2007/013621 A1 | 2/2007 |
| WO | 2007/074649 A1 | 7/2007 |

OTHER PUBLICATIONS

Final Office Action dated Aug. 18, 2010 issued for U.S. Appl. No. 11/773,792.

Office Action dated Jun. 10, 2010 issued for U.S. Appl. No. 11/861,217.

International Search Report dated May 12, 2009 issued by the Japanese Patent Office for International Application No. PCT/JP2009/056376.

Office Action dated Jan. 19, 2011 issued by the Japanese Patent Office for Japanese Application No. JP 2006-259646.

Dowski, Edward R. Jr., et al., "Extended Depth of Field through Wave-Front Coding", Appl. Opt. vol. 34, p. 1859-1866 (1995).

Dowski, Edward R. Jr., et al., "Wavefront Coding: a modern method of archieving high-performance and/or low-cost imaging systems", Current Developments in Optical Designs and Optical Engineering VIII, Proc. SPIE vol. 3779, p. 137-145, Oct. 1999.

Dowski, Edward R. Jr., et al., "Wavefront Coding: jointly optimized optical and digital imaging systems", Ed. Proc. SPIE Visual Information Processing IX, vol. 4041, p. 114-120, Apr. 25, 2000.

JAN

CODE49

QR CODE

STATE OF LIGHT BEAM IN OPTICAL SYSTEM

RELATIONSHIPS BETWEEN SENSOR AND PSF
(WITH SENSOR BEING FIXED)

(A)  (B)

RELATIONSHIPS BETWEEN SENSOR AND PSF
(WITH ABERRATION CONTROL OPTICAL SYSTEM BEING FIXED)

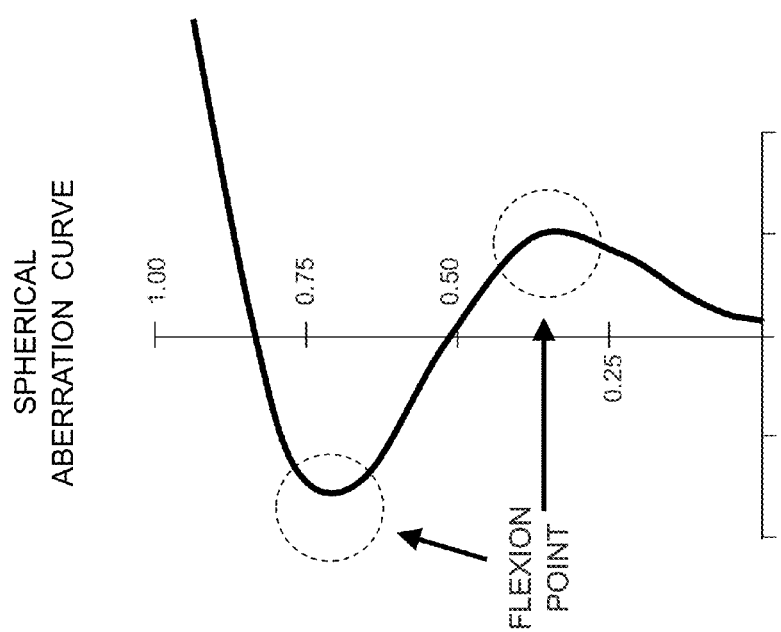

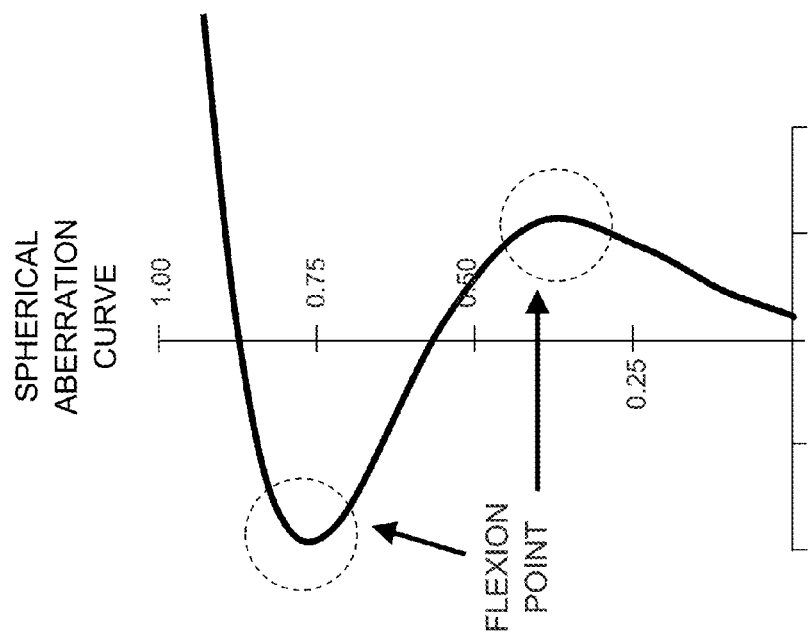

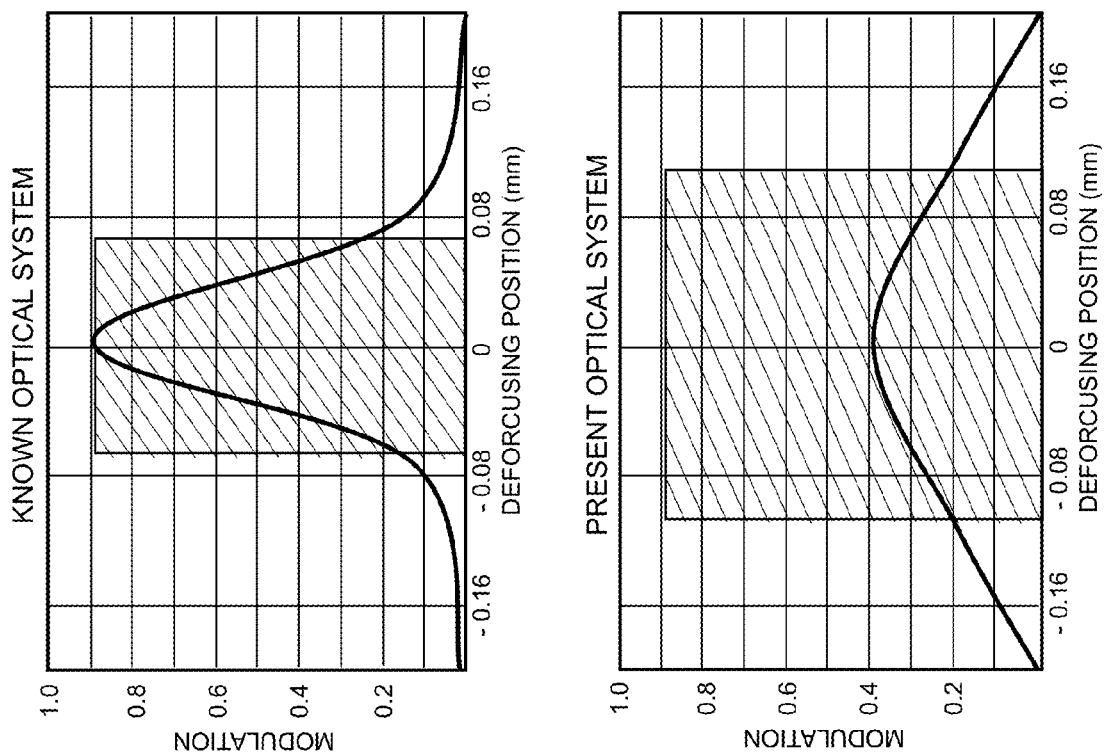
Figure 17A
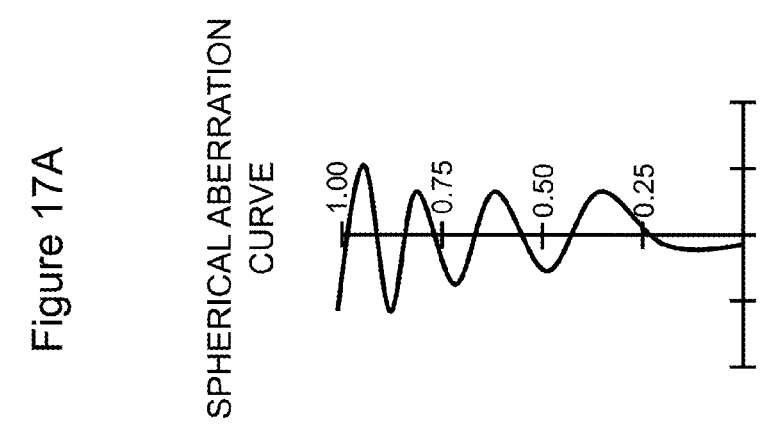

Figure 19C STOP IS CLOSED
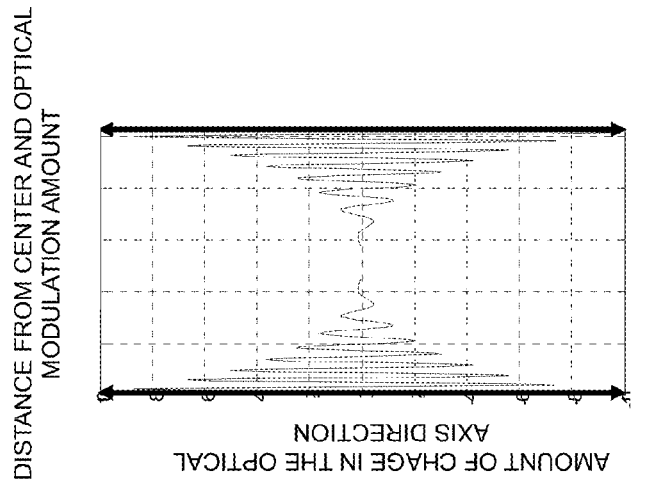
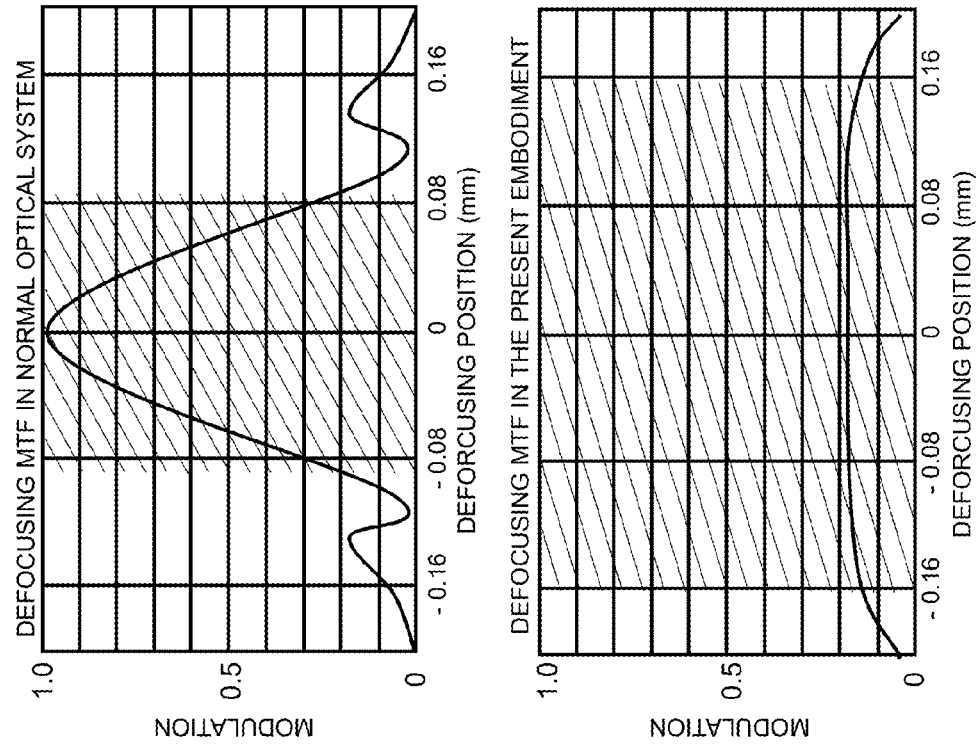

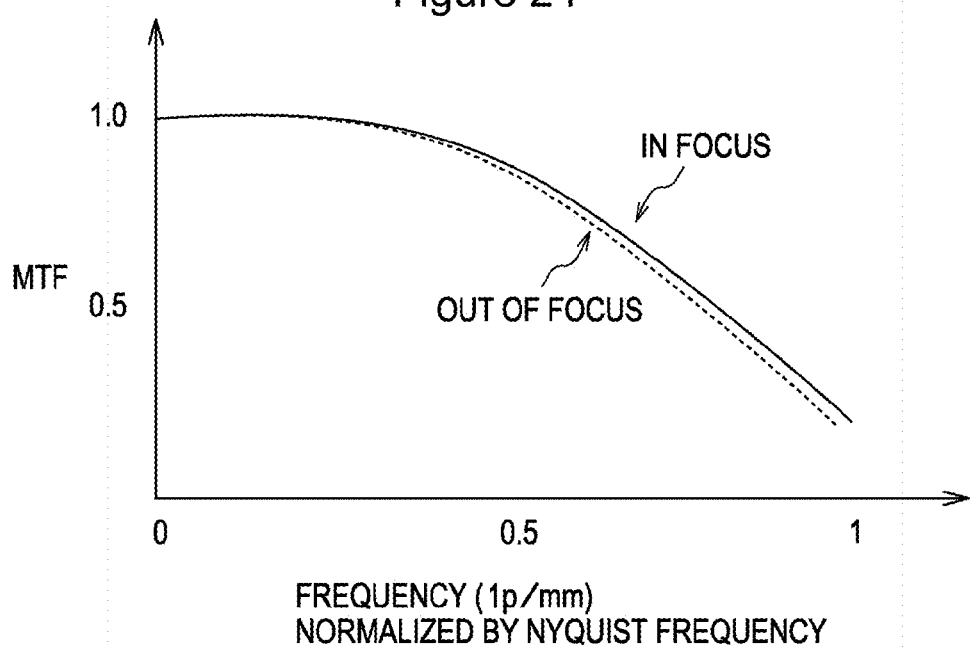

IMAGE PICKUP APPARATUS ELECTRONIC DEVICE AND IMAGE ABERRATION CONTROL METHOD

CROSS-REFERENCE TO RELATED APPLICATION

The present application is a continuation of U.S. patent application Ser. No. 12/549,566, filed on Aug. 28, 2009, which claims priority under 35 U.S.C. §119 to Japanese Patent Application No. 2008-220333, filed on Aug. 28, 2008, Japanese Patent Application No. 2008-278926, filed on Oct. 29, 2008, and Japanese Patent Application No. 2009-016754, filed on Jan. 28, 2009, each of which is incorporated by reference herein in its entirety.

FIELD OF THE INVENTION

Embodiments of the present invention relate generally to image pickup devices, and more particularly relate to optical systems for image pickup devices.

BACKGROUND

With the rapid development of digitalization of information, digitalization in image processing is increasingly required. In digital cameras in particular, solid-state image pickup devices, such as Charge Coupled Devices (CCD) and Complementary Metal Oxide Semiconductor (CMOS) sensors, have been used instead of film.

In image pickup apparatuses including CCDs or CMOS sensors, an image of an object is optically taken by an optical system and is extracted by an image pickup device in a form of an electric signal. In an image pickup apparatus, light is regularly dispersed by a phase plate and is reconstructed by digital processing techniques to achieve a large depth of field. In addition, a filtering process using a transfer function is performed in an automatic exposure control system for a digital camera.

Devices such as CCD and CMOS sensors that have image input functions sometimes read close-up still images, such as bar codes, together with desired images, such as landscape images. Techniques used for reading bar codes comprise an auto-focus technique in which focusing is performed by moving a lens towards and away from the bar code. In this case, a depth expansion technique is used in which the depth of field is increased by reducing the f-number in a camera so as to achieve a corrected focus.

In some image pickup apparatuses, a Point Spread Function (PSF) obtained is constant when the phase plate mentioned above is placed in the optical system. The PSF describes the response of an imaging system to a point source or point object. The degree of spreading (blurring) of the point object is a measure for the quality of an imaging system. If the PSF varies, it can be difficult to obtain an image with a large depth of field by convolution using a kernel.

Therefore, in lens systems (excluding single focus lens systems) such as zoom systems and autofocus (AF) systems, high precision is required in the optical design, thereby increasing costs accordingly. In an automatic exposure control system for a digital camera, filtering is performed using a transfer function. More specifically, in known image pickup apparatuses, a suitable convolution operation cannot be performed and the optical system should be designed to eliminate aberrations, such as astigmatism, coma aberration, and zoom chromatic aberration that cause a displacement of a spot image at wide angle and telephoto positions. However, eliminating the aberrations can increase the complexity of an optical design, the number of design steps, the costs, and the lens size.

The above-described techniques are premised on image restoration, and therefore increase noise and cost resulting from image processing. Further, since the optical transfer function (OTF) should not depend on an object distance in image restoration, it is necessary to design an optical system whose OTF remains constant even in an out-of-focus state. Even if depth extension is realized for an f-number having a certain characteristic, in general a depth extending function is lost or its efficiency significantly decreases when the aperture diameter changes.

Accordingly, there is a need for an image pickup apparatus that achieves depth extension without performing image restoration and that prevents the depth extending function from being impaired when the aperture diameter changes.

SUMMARY

An optical system comprising an aberration control optical system is disclosed. An aberration control optical system is operable to produce an image aberration, and an aperture stop is operable to limit a light beam passing through the aberration control optical system. An image pickup device is operable to capture an object image passing through the aberration control optical system, and the aberration control optical system provides inflection points within an effective diameter of the aperture stop to obtain a depth extending effect.

In a first embodiment, an image pickup apparatus comprises an optical system. The optical system comprises an aberration control optical system to produce aberration, an aperture stop to limit a light beam passing through the optical system, and an image pickup device to capture an object image passing through the optical system. The aberration control optical system has an aberration characteristic that provides a plurality of inflection points within an aperture diameter of the aperture stop to obtain a depth extending effect.

In a second embodiment, an electronic device comprises an image pickup apparatus. The image pickup apparatus comprises an aberration control optical system to produce aberration, a variable aperture stop to limit a light beam passing through the optical system, and an image pickup device to capture an object image passing through the optical system. The aberration control optical system has an aberration characteristic that provides inflection points within a variable aperture diameter of the variable aperture stop to obtain a depth extending effect.

A third embodiment comprises an image aberration control method. The method limits a light beam via a variable aperture stop passing through the aberration control optical system, and captures an object image passing through the aberration control optical system. The method further provides inflection points within a variable diameter of the variable aperture stop to obtain a depth extending effect.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the present invention. The figures are provided to facilitate understanding of the present invention without limiting the breadth, scope, scale, or applicability of the present invention. The drawings are not necessarily made to scale.

FIG. 15A is an illustration of a spherical aberration curve.

FIG. 16A is an illustration of a spherical aberration curve.

FIG. 17A is an illustration of spherical aberration and defocusing MTF based on an aperture diameter and depths in an optical system according to an embodiment of the present invention and a normal optical system in a state in which an aperture stop is opened.

FIG. 19C is an illustration of MTF in a normal optical system and an aberration control optical system in states in which the variable aperture stop is closed.

FIG. 24 is an illustration of an exemplary diagram showing an MTF response obtained after image processing process in an image pickup apparatus according to an embodiment of the present invention.

DETAILED DESCRIPTION OF EXEMPLARY EMBODIMENTS

The following description is presented to enable a person of ordinary skill in the art to make and use the embodiments of the invention. The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The invention should be accorded scope consistent with the claims, and not limited to the examples described and shown herein.

The following detailed description is exemplary in nature and is not intended to limit the invention or the application and uses according to one embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The invention should be accorded scope consistent with the claims, and not limited to the examples described and shown herein.

Embodiments of the invention are described herein in the context of practical non-limiting applications, namely image processing. Embodiments of the invention, however, are not limited to such image processing applications, and the techniques described herein may also be utilized in other optical applications. For example, embodiments may be applicable to image projection apparatuses, and the like.

As would be apparent to one of ordinary skill in the art after reading this description, these are merely examples and the embodiments of the present invention are not limited to operating in accordance with these examples. Other embodiments may be utilized and structural changes may be made without departing from the scope of the exemplary embodiments of the present invention.

Figure 1:
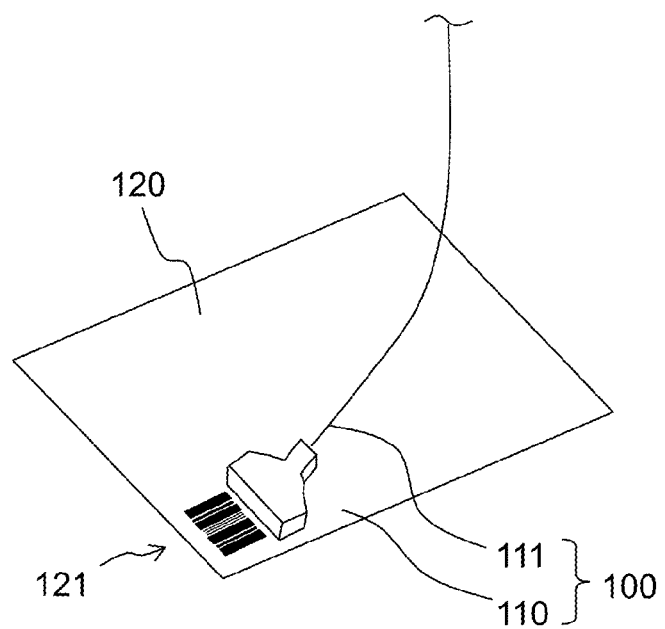
FIG. 1 is an illustration of an outside view of an exemplary information code reading device according to an embodiment of the present invention.

FIG. 1 is an illustration of an outside view of an exemplary information code reading device 100 according to an embodiment of the present invention. The information code reading device 100 can be used as an electronic device applicable to an imaging device of the present embodiment.

Figure 2A:
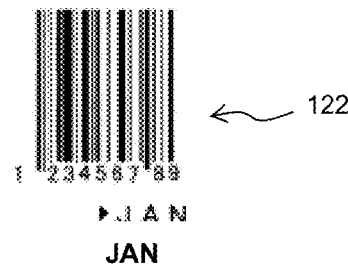
FIG. 2A is an illustration of an exemplary JAN code.
Figure 2B:
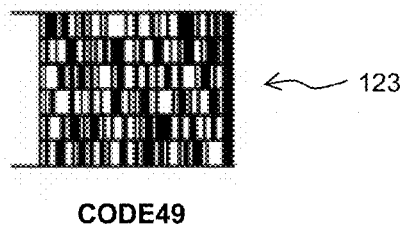
FIG. 2B is an illustration of an exemplary CODE 49.
Figure 2C:
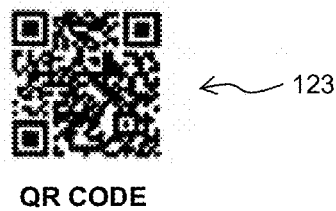
FIG. 2C is an illustration of an exemplary QR code.

FIG. 2A is an illustration of an exemplary JAN code, FIG. 2B is an illustration of an exemplary CODE 49, and FIG. 2C is an illustration of an exemplary QR code.

The information code reading device 100 comprises a main body 110 coupled to a processing device such as an electronic register (not shown) via a cable 111. The information code reading device 100 is operable to read an information code 121. The information code 121 may be, for example and without limitation, a symbol, or a code having different reflectivity printed on a reading object 120, and the like. For example, but without limitation, the information code 121 may be a one-dimensional barcode 122 (FIG. 2A) such as the JAN code, or a two-dimensional barcode 123 such as a stack-type CODE 49 (FIG. 2B) or a matrix type QR code (FIG. 2C), and the like.

Figure 3:
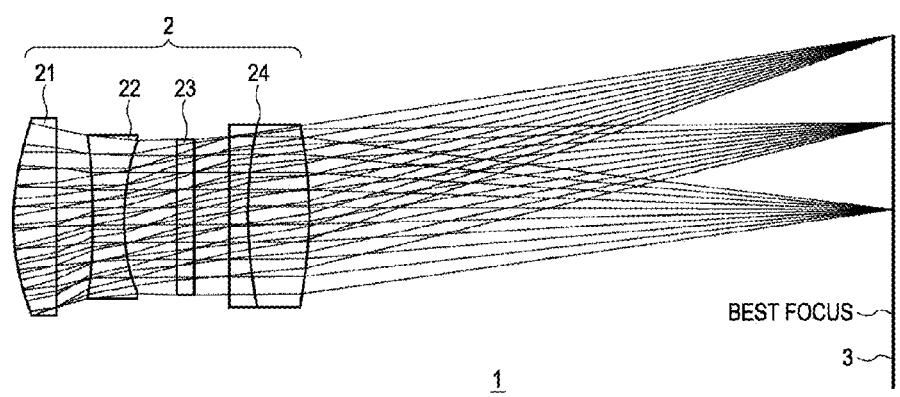
FIG. 3 is an illustration of a schematic diagram showing a structure of an existing image pickup apparatus and traces of light ray bundles.

FIG. 3 is an illustration of a schematic diagram showing a structure of an existing image pickup apparatus 1 and traces of light ray bundles. The image pickup apparatus 1 comprises an optical system 2 and an image pickup device 3. The optical system 2 comprises object-side lenses 21 and 22, an aperture stop 23, and an imaging lens 24 arranged in order from an object side (OBJS) toward the image pickup device 3. The image pickup device 3 may, without limitation, be a semiconductor sensor such as a CCD and a CMOS sensor.

The object-side lenses 21 and 22 focus the image of an object before the aperture stop 23, and the imaging lens 24 focuses the image of an object after the aperture stop 23.

Figure 4A:
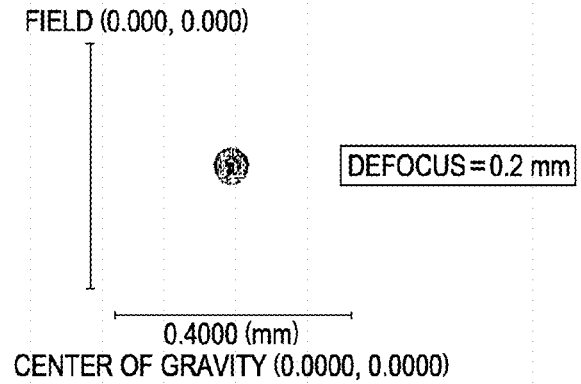
FIG. 4A is an illustration of spot images formed on a light-receiving surface of an image pickup device in the image pickup apparatus shown in FIG. 1 when a focal point is displaced by 0.2 mm (Defocus=0.2 mm).
Figure 4B:
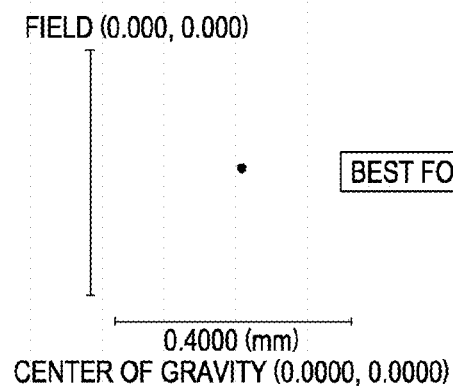
FIG. 4B is an illustration of spot images formed on a light-receiving surface of an image pickup device in the image pickup apparatus shown in FIG. 1 when the focal point is not displaced (Best focus).
Figure 4C:
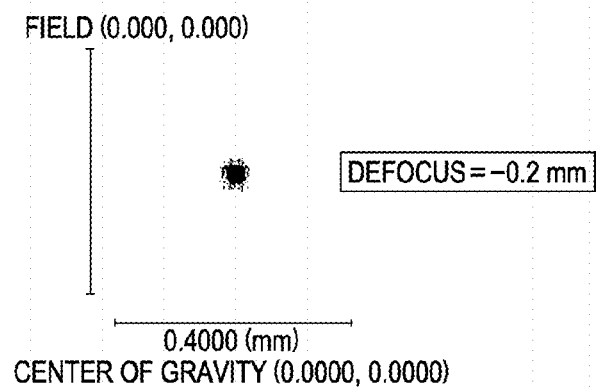
FIG. 4C is an illustration of spot images formed on a light-receiving surface of an image pickup device in the image pickup apparatus shown in FIG. 1 when the focal point is displaced by −0.2 mm (Defocus=−0.2 mm).

In the image pickup apparatus 1, the best-focus plane coincides with the plane on which the image pickup device 3 is located. FIGS. 4A to 4C are illustration of spot images formed on a light-receiving surface of an image pickup device 3 in the image pickup apparatus 1 shown in FIG. 1 when a focal point is displaced by 0.2 mm (Defocus=0.2 mm), when the focal point is not displaced (Best focus), and when the focal point is displaced by −0.2 mm (Defocus=−0.2 mm) respectively.

Figure 5:
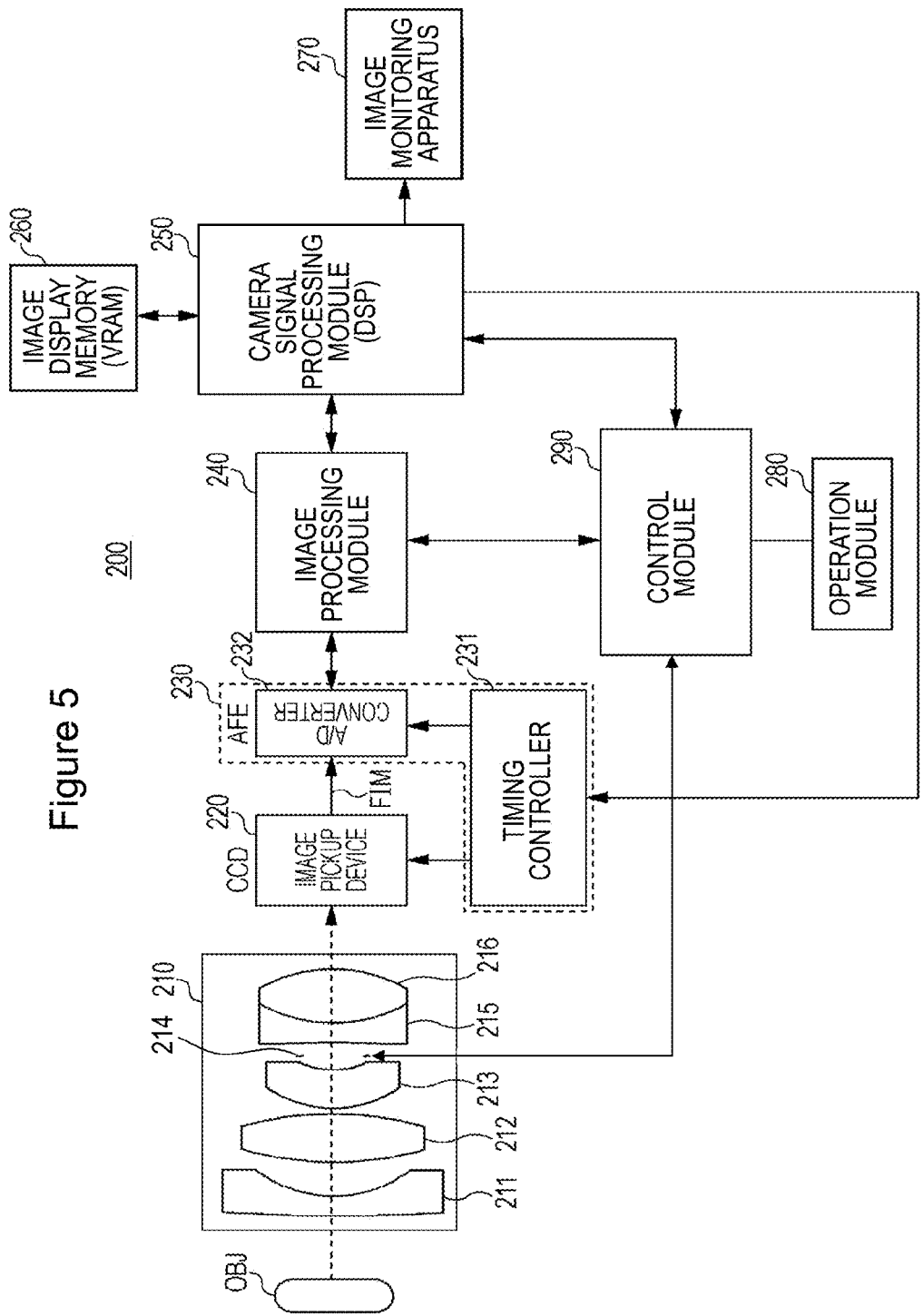
FIG. 5 is an illustration of a block diagram of an exemplary image pickup apparatus that can be used as an information code reading device of FIG. 1 according to an embodiment of the present invention.

In the main body 110 (FIG. 1) of the information code reading device 100, an illumination light source (not shown) and an image pickup apparatus 200 shown in FIG. 5 are arranged.

FIG. 5 is an illustration of a block diagram of an exemplary image pickup apparatus 200 that can be used as the information code reading device 100 of FIG. 1 according to an embodiment of the present invention. The image pickup apparatus 200 adopts an aberration control optical system that employs an aberration control section (e.g., an aberration control surface or an aberration control element) to intentionally produce aberration (i.e., spherical aberration), that has a depth extending function, and that maintains the depth extending function even when an aperture diameter of a variable aperture stop changes. Alternatively, the image pickup apparatus 200 can adopt an aberration control optical system that employs an aberration control section (device) to intentionally produce aberration, that has a depth extending function, and that changes an aberration control function of the aberration control optical system in response to a change in the aperture diameter of the variable aperture stop. In this manner, it is possible to reliably and accurately read information codes, for example, a one-dimensional bar code, such as a JAN code, and a two-dimensional bar code such as a QR code.

In addition, the image pickup apparatus 200 can adopt an aberration control optical system that prevents a decrease in the MTF peak value and performs depth extension by producing at least two peaks to a modulation transfer function (MTF) for defocusing in a principal-image-surface shift area having an arbitrary frequency. In this manner, it possible to reliably and accurately read information codes, for example but without limitation, a one-dimensional bar code, such as a JAN code and a two-dimensional bar code such as a QR code.

The image pickup apparatus 200 comprises an aberration control optical system 210 and an imaging element 220 (image pickup device 220). The image pickup apparatus 200 further comprises an analog front end module (AFE) 230, an image processing module 240, a camera signal processing module 250, an image display memory 260, an image monitoring module 270, an operation module 280, and a control module 290.

The image pickup apparatus 200 (imaging device 200) comprises the aberration control optical system 210 and the image pickup device 220 (imaging element 220) for obtaining a first image, and also comprises the image processing module 240 for forming a final high-definition image from the first image. The aberration control optical system 210 comprises an aberration control element or an optical element, such as but without limitation, a glass element and a plastic element. The aberration control element or the optical element has a surface processed so as to control an aberration, so that the wavefront of light can be changed (modulated). The light with the modulated wavefront forms an image, i.e., the first image, on the imaging plane (light-receiving surface) of the image pickup device 220.

According to an embodiment, the image pickup apparatus 200 is configured to function as an image-forming system that can obtain a high-definition image from the first image through the image processing module 240.

The first image obtained by the image pickup device 220 is in light conditions with a large depth of field. Therefore, a modulation transfer function (MTF) of the first image is low and is corrected by the image processing module 240.

Figure 6:
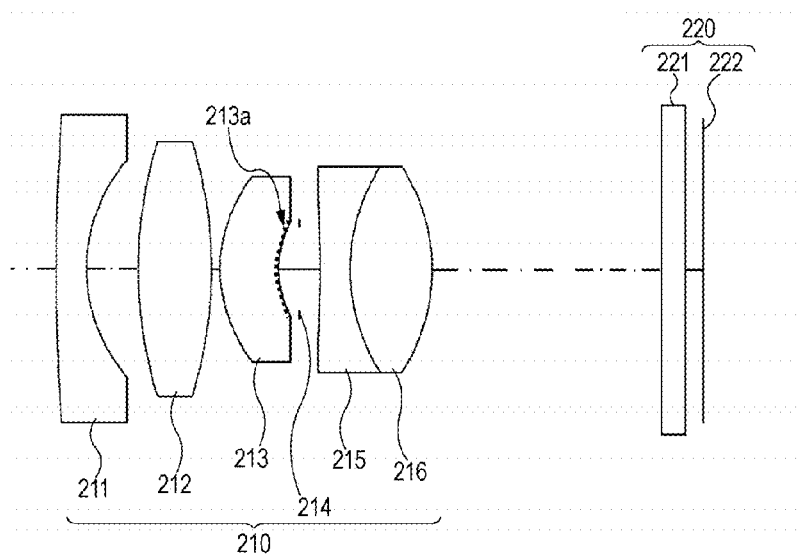
FIG. 6 is an illustration of an exemplary configuration of an imaging lens module comprised in an optical system according to one embodiment of the present invention.

FIG. 6 is an illustration of an exemplary configuration of an imaging lens module comprised in an optical system according to one embodiment of the present invention. An aberration control optical system 210 supplies a taken image of an object OBJ to an image pickup device 220. In the aberration control optical system 210, a first lens 211, a second lens 212, a third lens 213, a variable aperture stop 214, a fourth lens 215, and a fifth lens 216 are arranged in that order from the object side.

In the aberration control optical system 210, the fourth lens 215 and the fifth lens 216 are coupled to each other. That is, the lens unit of the aberration control optical system 210 comprises a cemented lens.

The aberration control optical system 210 serves as an optical system that employs an aberration control surface having an aberration control function of intentionally producing aberration.

In the embodiment shown in FIG. 6, it is necessary to insert the aberration control surface 213a in order to produce the spherical aberration. The aberration control effect may be obtained by inserting a separate aberration control element.

In the embodiment shown in FIG. 6, an aberration control surface 213a (a surface R2 of the third lens 213) is provided in an optical system. Preferably, the aberration control surface 213a is adjacent to the variable aperture stop 214.

In this document, the term "aberration control surface" refers to a lens surface having an aberration control effect similar to the aberration control element.

The aberration control optical system 210 has an aberration characteristic that a depth extending effect (function) is maintained even when the aperture diameter of the variable aperture stop 214 changes.

The aberration control optical system 210 can select an f-number from a plurality of f-numbers by changing the aperture diameter of the variable aperture stop 214, and can perform depth extension due to the effect of the aberration control element or the aberration control surface 213a depending on the selected f-number.

The aberration control optical system 210 has an aberration characteristic that a plurality of (at least two) inflection points are provided within the effective aperture diameter of the variable aperture stop 214.

Further, the aberration control optical system 210 has an aberration characteristic that allows at least one inflection point in a region of the aberration control surface, except in a region where the light beam passes when the aperture of the variable aperture stop 214 is opened and a region where the light beam passes when the aperture diameter of the variable aperture stop 214 is smallest to attain the depth extending effect of the aberration control function.

In other words, the aberration control optical system 210 has an aberration characteristic that allows at least one inflection point between a region of the aberration control surface where the light beam passes corresponding to the smallest f-numbers expected to serve the depth extending function, and a region of the aberration control surface where the light beam passes corresponding to the largest f-number.

Figure 7:
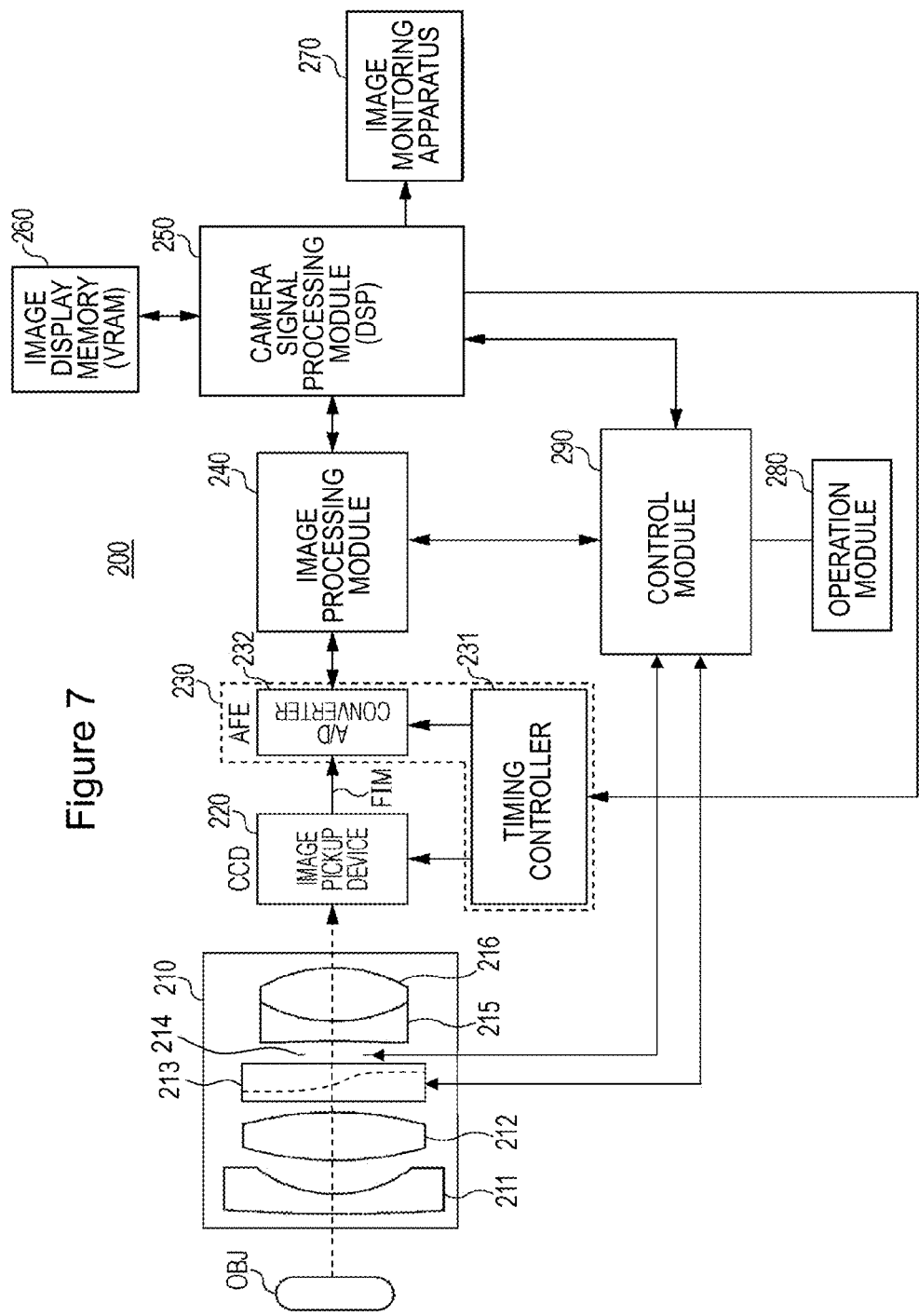
FIG. 7 is an illustration of a block diagram of an exemplary image pickup apparatus according to an embodiment of the present invention.
Figure 8:
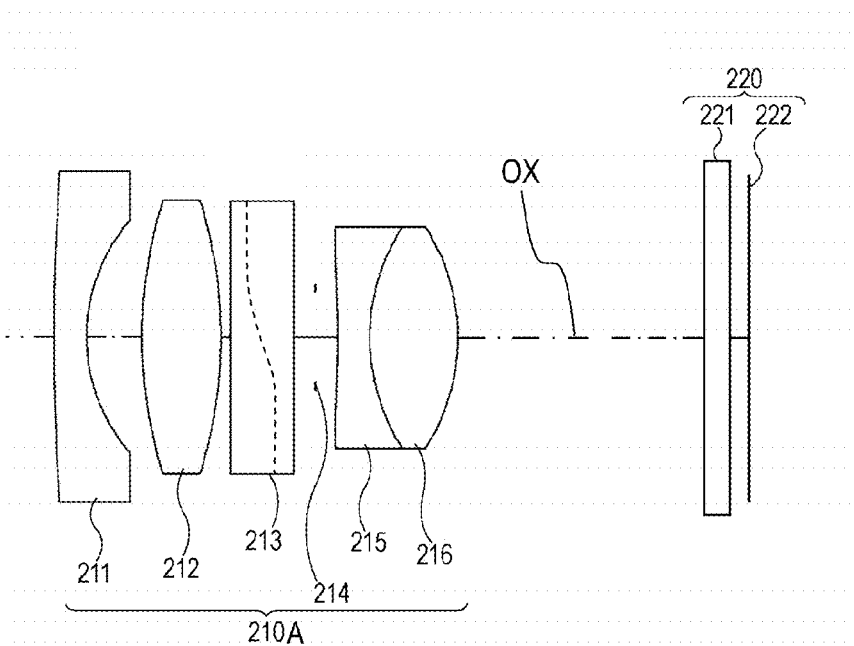
FIG. 8 is an illustration of an exemplary configuration of an imaging lens module comprised in the optical system according to an embodiment of the present invention.

FIG. 7 is an illustration of a block diagram of an exemplary image pickup apparatus 200 that can be used as the information code reading device 100 of FIG. 1 according to an embodiment of the present invention. FIG. 8 is an illustration of an exemplary configuration of an imaging lens module of the optical system 210 according to an embodiment of the present invention.

An aberration control optical system 210A (FIG. 8) supplies a taken image of an object OBJ to an image pickup device 220. The aberration control optical system 210A, a first lens 211, a second lens 212, an externally dependent aberration control element 213 (third lens 213), a variable aperture stop 214, a fourth lens 215, and a fifth lens 216 are arranged from the object OBJ side. The fourth lens 215 and the fifth lens 216 are coupled to each other.

The aberration control optical system 210A is operable to intentionally produce aberration by employing an aberration control element having an aberration control function. The aberration control optical system 210A has an aberration characteristic that allows the aberration control function of the aberration control optical system 210 to change (is variable) in response to a change in an aperture diameter of the variable aperture stop 214.

In the aberration control optical system 210A, at least one inflection point is provided in the refractive index of spherical aberration within the aperture diameter of the variable aperture stop 214, regardless of size of the aperture diameter.

The difference in refractive index of the inflection point from a center portion of an optical axis OX increases from the center portion toward a peripheral portion.

Further, the difference in refractive index of the inflection point from the center portion of the optical axis OX increases as the aperture diameter of the variable aperture stop 214 decreases.

The aberration control optical system 210A employs the externally dependent aberration control element 213 (lens 213) as an element that can change the aberration control function (i.e., the aberration control function is variable) of the aberration control optical system 210A in response to a change in aperture diameter of the variable aperture stop 214.

The externally dependent aberration control element 213 is configured to perform independently. That is, the externally dependent aberration control element 213 is controlled from outside of the aberration control optical system 210. The externally dependent aberration control element 213 performs an aberration control function which can change aberration in image formation on a light receiving surface of the image pickup device 220. For example, but without limitation, the externally dependent aberration control element 213 can also control the degree of the change of the aberration including no change.

When a control module 290 exerts control so that the aberration control function of the externally dependent aberration control element 213 is not performed, the aberration control optical system 210A is brought into a single-focus state and provides high imaging performance. In contrast, when the control module 290 exerts control so that the aberration control function is performed, the aberration control optical system 210A is brought into a multi-focus state.

When the aberration control function of the externally dependent aberration control element 213 is performed, the degree of performance of the aberration control function is changed (is variable) under the control of the control module 290 in accordance with the change of the variable aperture stop 214.

Figure 9:
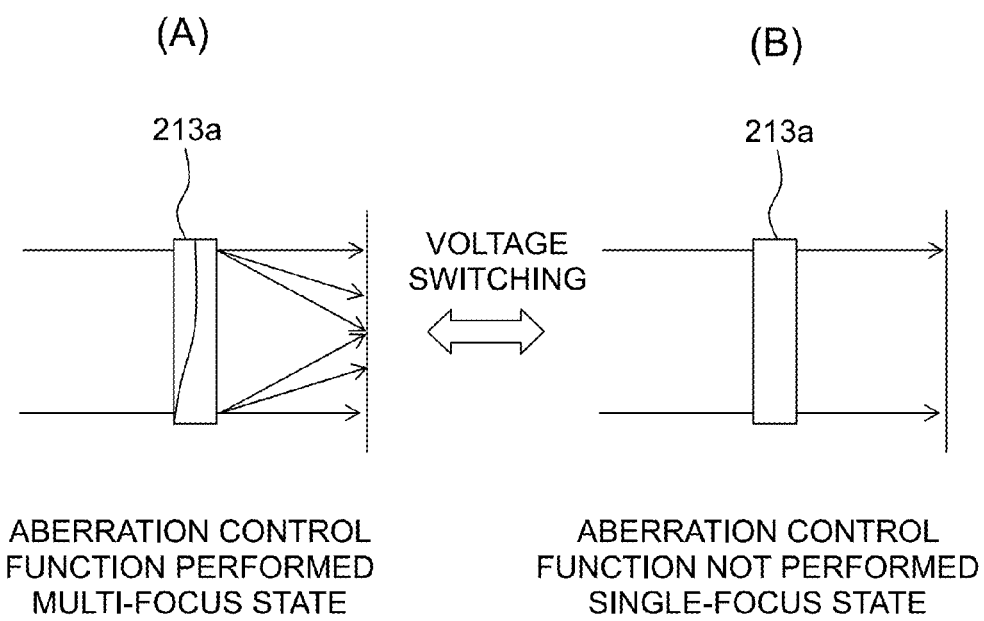
FIG. 9 is an illustration of a structure and function of an externally dependent aberration control element according to an embodiment of the present invention.
Figure 10:
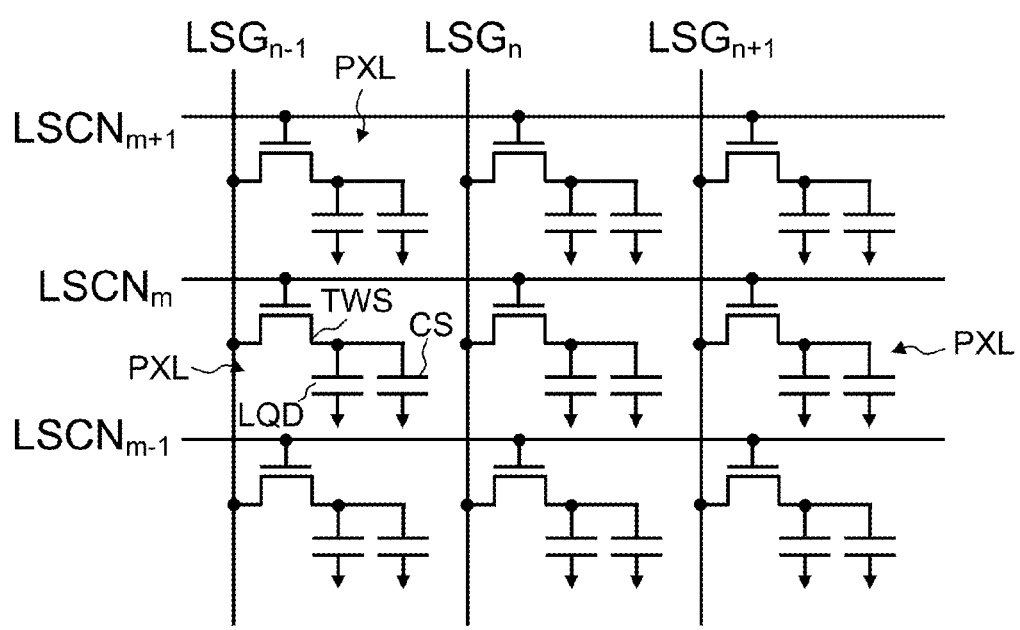
FIG. 10 is an illustration of a liquid crystal device applicable to a variable aperture.
Figure 11:
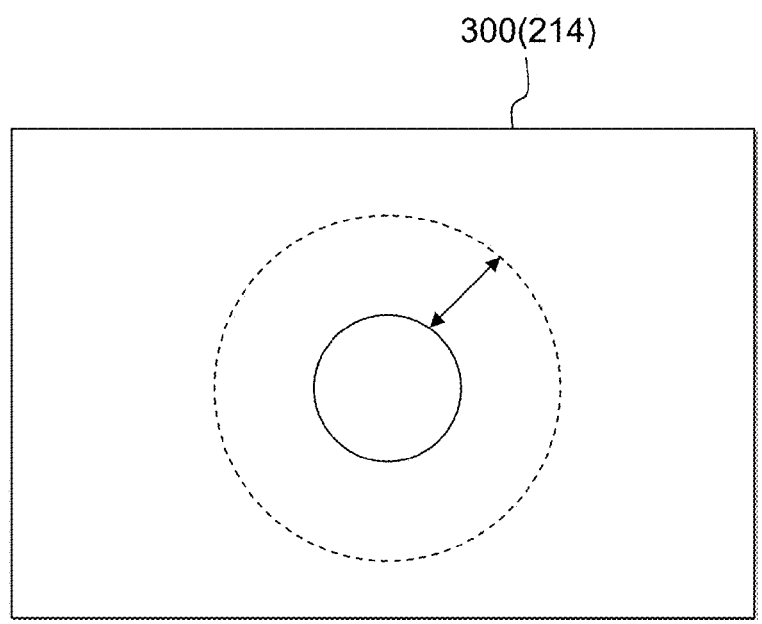
FIG. 11 is an illustration of an operation of control an aperture diameter of a liquid crystal device.

FIG. 9 is an illustration of a structure and function of the externally dependent aberration control element 213 according to an embodiment of the present invention. FIG. 10 is an illustration of a liquid crystal device applicable to a variable aperture stop. FIG. 11 is an illustration of an operation of controlling the aperture diameter of the liquid crystal device used as the variable aperture stop.

The externally dependent aberration control element 213 can be formed, for example but without limitation, by a liquid crystal element (liquid crystal lens) 213a, as shown in FIG. 9.

By switching the voltage applied to the liquid crystal lens 213a, the light collecting state can be changed.

When a voltage is applied to the aberration control surface 213a such as the liquid crystal lens by the control module 290, for example, the aberration control surface 213a (liquid crystal lens) is controlled so as to perform the aberration control function, and the aberration control optical system 210A is brought into a multi-focus state, as shown in FIG. 9(A).

In contrast, when voltage is not applied, or switched to a level lower than in the state in which the aberration control function is performed, by the control module 290, the aberration control surface 213a (liquid crystal lens) is controlled so as not to perform the aberration control function, and the aberration control optical system 210A is brought into a single-focus state, as shown in FIG. 9(B).

In the state in which the aberration control function of the aberration control surface 213a (liquid crystal lens) is performed, the degree of performance of the aberration control function changes (is variable) in accordance with the change of the variable aperture stop 214 under the control of the control module 290.

Voltage applied to the aberration control surface 213a (liquid crystal lens) is changed to control the degree of performance of the aberration control function. The applied voltage can be changed, for example but without limitation, linearly, stepwise, or the like. In this manner, a multi-focus state of the aberration control surface 213a (liquid crystal lens) can change in response to the change in the applied voltage.

In an embodiment, the variable aperture stop 214 can have various shapes. However, when the externally dependent aberration control element 213 is formed by the aberration control surface 213a (liquid crystal lens), as described above, it is preferable, from the viewpoint of response, that the variable aperture stop 214 be formed by a liquid crystal device. For example, in a liquid crystal device 300 shown in FIG. 10, pixels, each of which are defined by a switching transistor TSW, a liquid crystal element LQD, and a storage capacitance CS, are arranged in a matrix.

A source of each switching transistor TSW is connected to a signal line LSG, and a gate of the switching transistor TSW is connected to a scanning line LSCN. The control module 290 drives a signal-line driver and a scanning-line driver (not shown) to control transmission and block of light in the pixels PXL, thus obtaining the required aperture diameter, as shown in FIG. 11.

The above-described aberration control function refers to a function of intentionally producing aberration. By properly controlling aberrations, particularly spherical aberration, depth extension can be achieved without performing image restoration. More specifically, the change in OTF in an out-of-focus state can be controlled by producing at least two peaks to an MTF for defocusing in a principal-image-surface shift area having an arbitrary frequency.

Therefore, the spherical aberration is provided with an inflection point. The externally dependent aberration control element 213 for controlling aberration is formed by the aberration control surface 213a (liquid crystal lens), and a hybrid structure with the variable aperture stop 214. In this manner, since the aberration control can be performed by the variable aperture stop 214, spherical aberration can be controlled more easily.

The aberration control optical system 210A having the above-described configuration can select an f-number from a plurality of f-numbers by changing the aperture diameter. Whichever f-number is selected, depth extension is performed by the effect of the aberration control function. During depth extension, the refractive index of the aberration control surface 213a (liquid crystal lens) has at least one inflection point within the aperture diameter from the center portion (an intersection with the optical axis OX) toward the peripheral portion, so that spherical aberration can have at least one inflection point, as will be described below. In an embodiment, the difference in refractive index between the inflection point and the center portion increases from the center portion toward the peripheral portion.

In general, a light beam passing through the peripheral portion of the aperture forms a larger angle (a larger numerical aperture (NA)) on the image plane than a light beam passing through the center portion. That is, the focal depth of the light beam decreases the NA increases in the normal optical system. To cancel this, it is preferable to increase the amount of aberration (e.g., amount of spherical aberration).

In an embodiment, the difference in refractive index of the inflection point from the center portion increases as the f-number increases. This is because the focal depth increases as the f-number increases and a large amount of aberration is therefore needed to achieve reasonable depth extension.

The aberration control optical system 210A serves as a depth extending optical system which uses the aberration control optical system. The aberration control optical system 210A comprises the aberration control surface having the aberration control function so as to form a PSF extending over two or more pixels and in which the defocusing MTF has at least two peaks within a principle-surface shift area where spurious resolution does not occur at a predetermined frequency.

In a general depth extending optical system having the wavefront modulation function, depth extension is performed by broadening a base of one peak of the MTF. In this case, however, the peak value of the MTF decreases. In contrast, according to an embodiment of the invention, depth extension can be realized while restricting the decrease in the peak value of the MTF, by forming peaks with the aberration control function. As explained above, by properly controlling spherical aberration, depth extension can be performed without image restoration. More specifically, in the aberration control optical system 210A, a plurality of peaks (two peaks in this embodiment) is produced for the defocusing MTF by the aberration control element or the aberration control surface for mainly producing spherical aberration. Whereby, the change in OTF in an out-of-focus state can be controlled, and depth extension can be performed. To form the peaks, inflection points are provided in the spherical aberration.

By properly producing at least two inflection points of the spherical aberration, as described above, depth extension can be realized as a function of the aperture diameter.

As described above, it is preferable that at least one inflection point be provided between the region of the aberration control surface where the light beam passes corresponding to the smallest f-numbers that are expected to serve the depth extending function, and the region of the aberration control surface where the light beam passes corresponding to the largest f-number. This allows the depth extending function to be efficiently obtained even when the f-number changes.

The characteristic structures and functions of the aberration control optical system 210A are described in more detail below.

Figure 12:
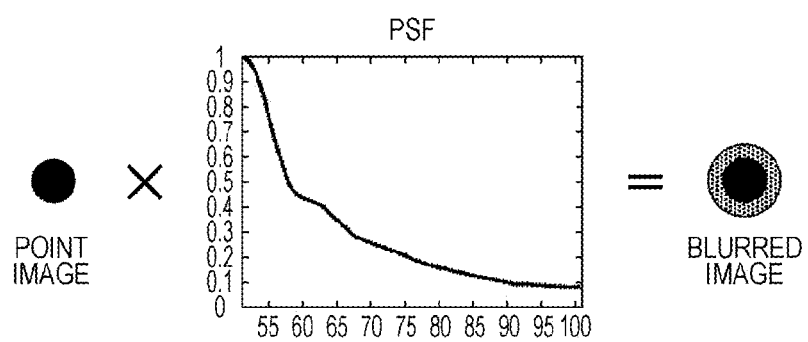
FIG. 12 is an illustration of amount of a spherical aberration of an aberration control optical system according to an embodiment of the invention.
Figure 12:
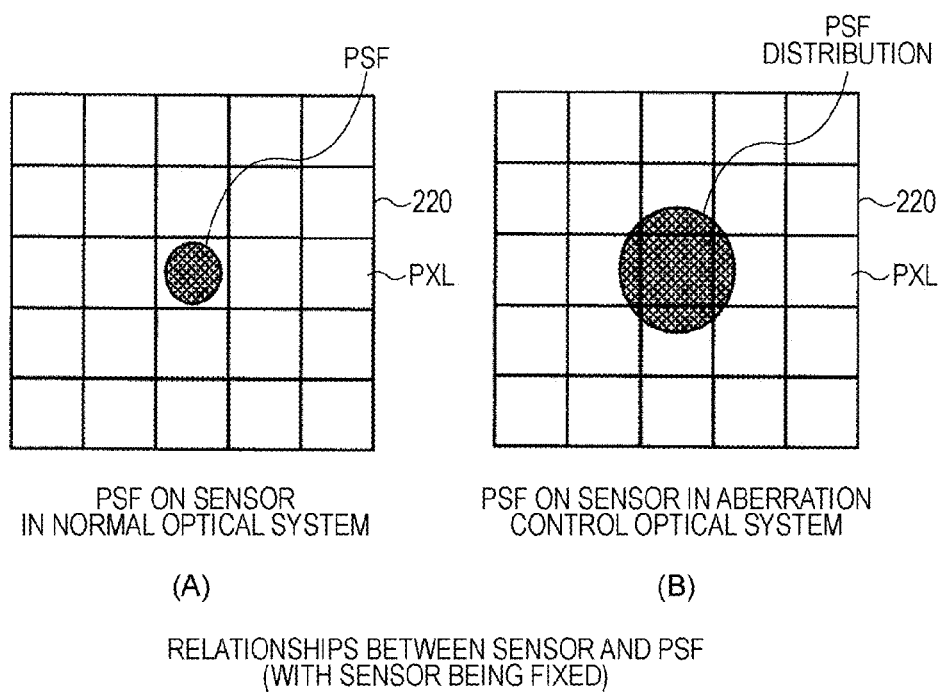
Figure 13:
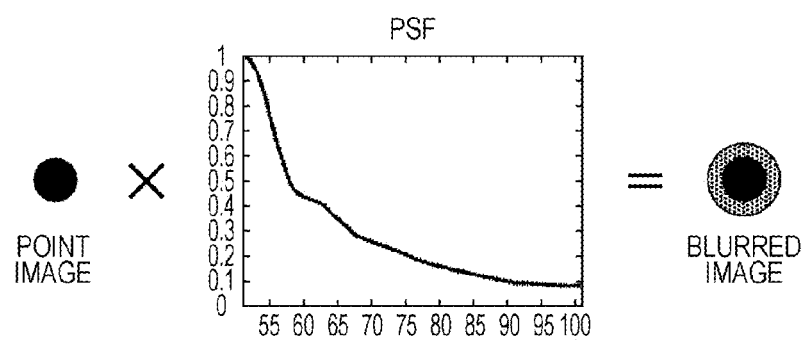
FIG. 13 is a illustration of an amount of a spherical aberration of an aberration control optical system according to an embodiment of the present invention.
Figure 13:
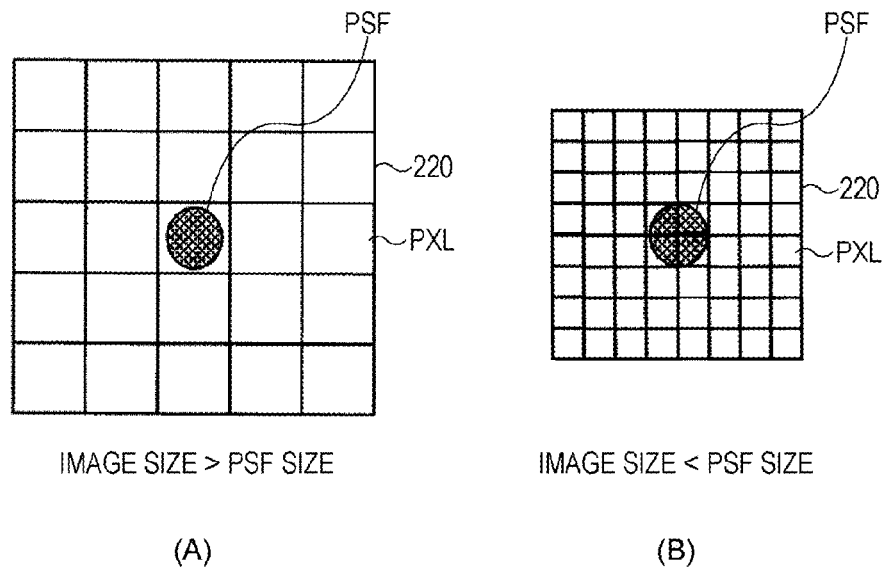

FIGS. 12 and 13 are illustrations of amount of spherical aberrations in the aberration control optical system 210A. In FIGS. 12, (A) and (B) show relationships between the image pickup device (sensor) and the PSF when the sensor is fixed. In FIGS. 13, (A) and (B) show the relationships between the sensor and the PSF when the aberration control optical system 210A is fixed.

For example, it is assumed that the image pickup device 220 is a sensor having a certain pixel pitch. In this case, it is necessary to produce spherical aberration so that the PSF is larger than one pixel PXL. When spherical aberration is produced in a manner such that the PSF is small enough to fit in one pixel PXL, as shown in FIG. 12 (A) and FIG. 13 (A), there is substantially no difference from the normal optical system. In the normal optical system, the PSF at the center focus position is the smallest.

In contrast, in the aberration control optical system 210A according to an embodiment of the invention, the size of the PSF is controlled so that the PSF does not fit in one pixel PXL not only at the in-focus position, but also at the out-of-focus position as shown in FIG. 12 (B) and FIG. 13 (B). In other words, the aberration control optical system 210A extends the depth of field by producing at least two peaks to the defocusing MTF.

Next, selection of a suitable image pickup device (sensor) for the aberration control optical system will be described. For example, when the aberration control optical system has a certain PSF size, it is preferable to select a sensor having a pixel pitch smaller than the PSF size, as shown in FIG. 13 (B). If a sensor having a pixel pitch larger than the PSF size is selected, there is substantially no difference from the normal optical system. In this case, therefore, it is difficult to effectively obtain the effect of spherical aberration of the aberration control optical system.

Figure 14A:
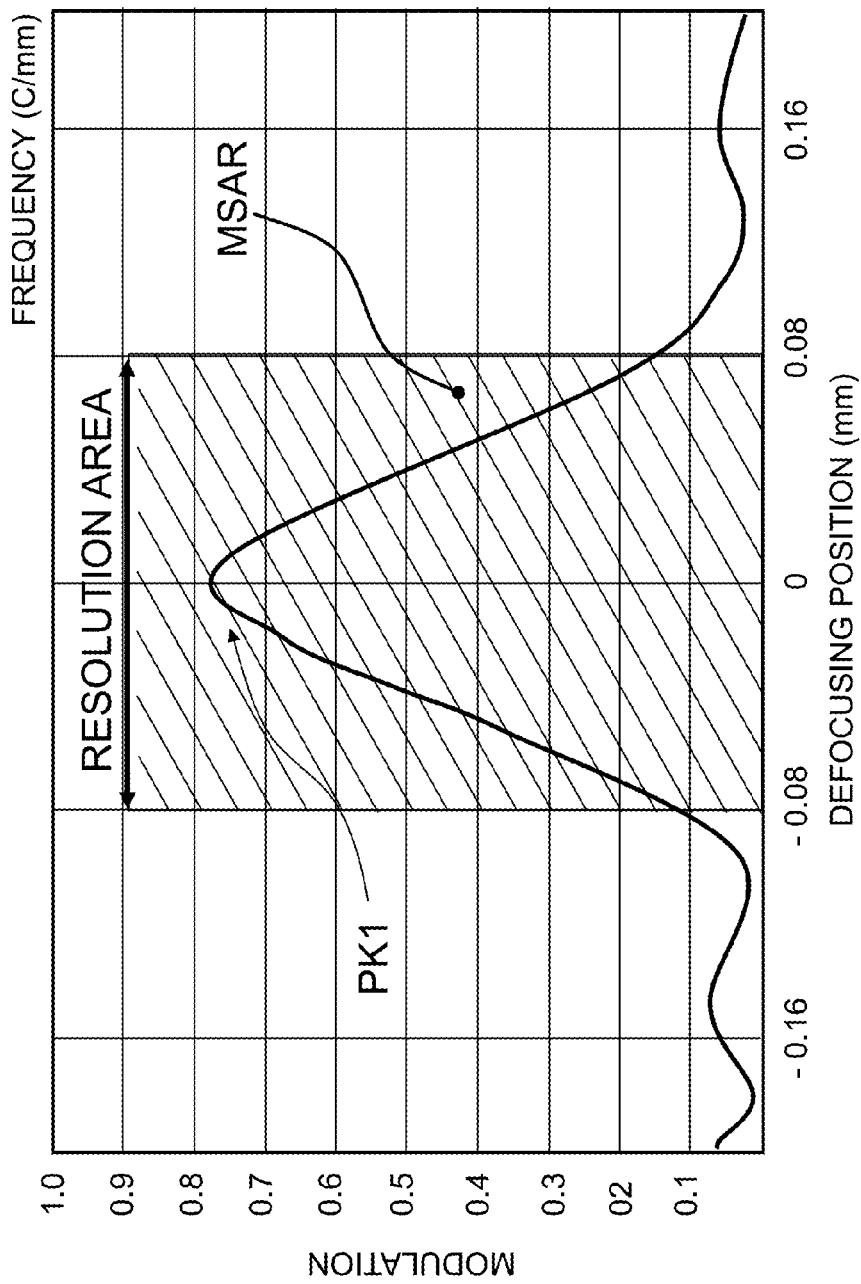
FIG. 14A is an illustration of a state of an MTF for defocusing in the normal optical system.
Figure 14B:
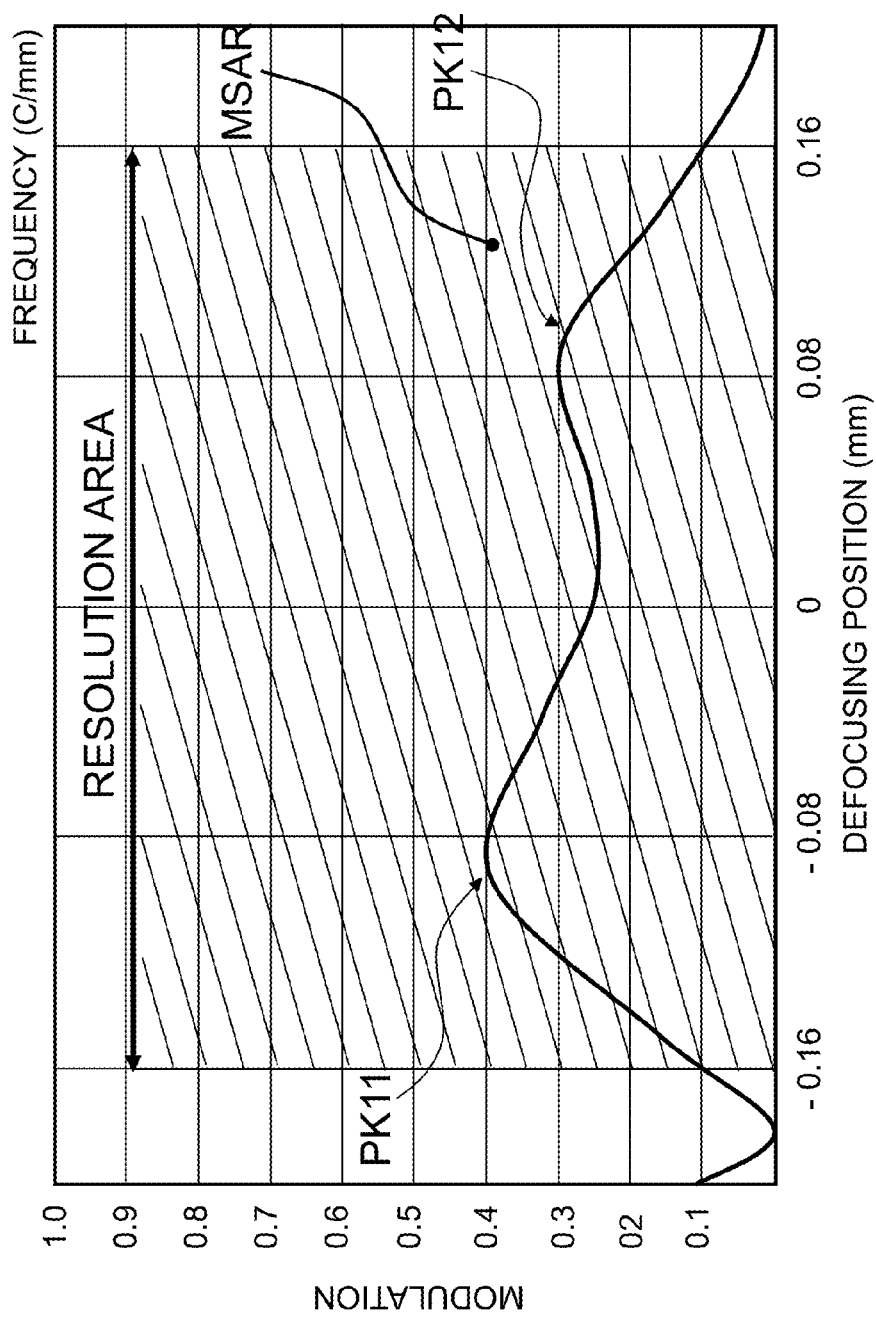
FIG. 14B is an illustration of a state of an MTF for defocusing in the aberration control optical system according an embodiment of the present invention.
Figure 14C:
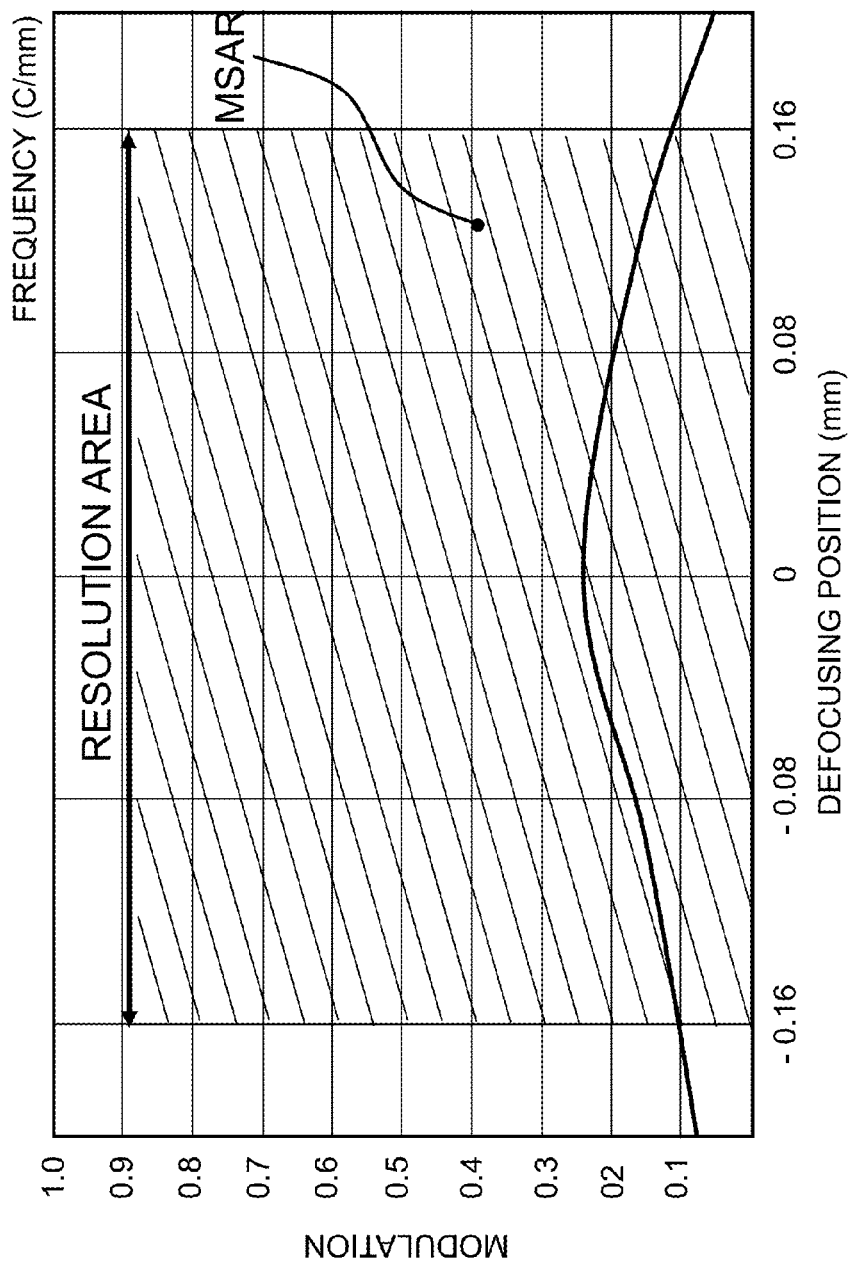
FIG. 14C is an illustration of a state of an MTF for defocusing in which one peak is enlarged.

FIGS. 14A to 14C show MTFs for defocusing in the normal optical system and in the aberration control optical system according to an embodiment of the invention. FIG. 14A shows a state of the MTF for defocusing in the normal optical system. FIG. 14B shows a state of the MTF for defocusing in the aberration control optical system according to one embodiment. FIG. 14C shows a state of the MTF for defocusing in which one peak is enlarged.

The normal optical system provides one focal point at the center, as shown in FIG. 14A. Since the second peaks on both sides are reversed at the bottom, spurious resolution occurs. For this reason, a resolution area is a hatched principal-image-plane shift area MSAR. When depth extension is performed with one peak in the normal optical system, the MTF significantly decreases, as shown in FIG. 14C.

Accordingly, in the aberration control optical system according to an embodiment, two peaks PK11 and PK12 are provided in the MTF for defocusing, as shown in FIG. 14B, in contrast to one peak PK1 in the normal optical system. While the MTF slightly decreases, the depth is substantially doubled by the two peaks, and the degree of decrease in the MTF is smaller than when depth extension is performed with one peak.

Figure 15B:
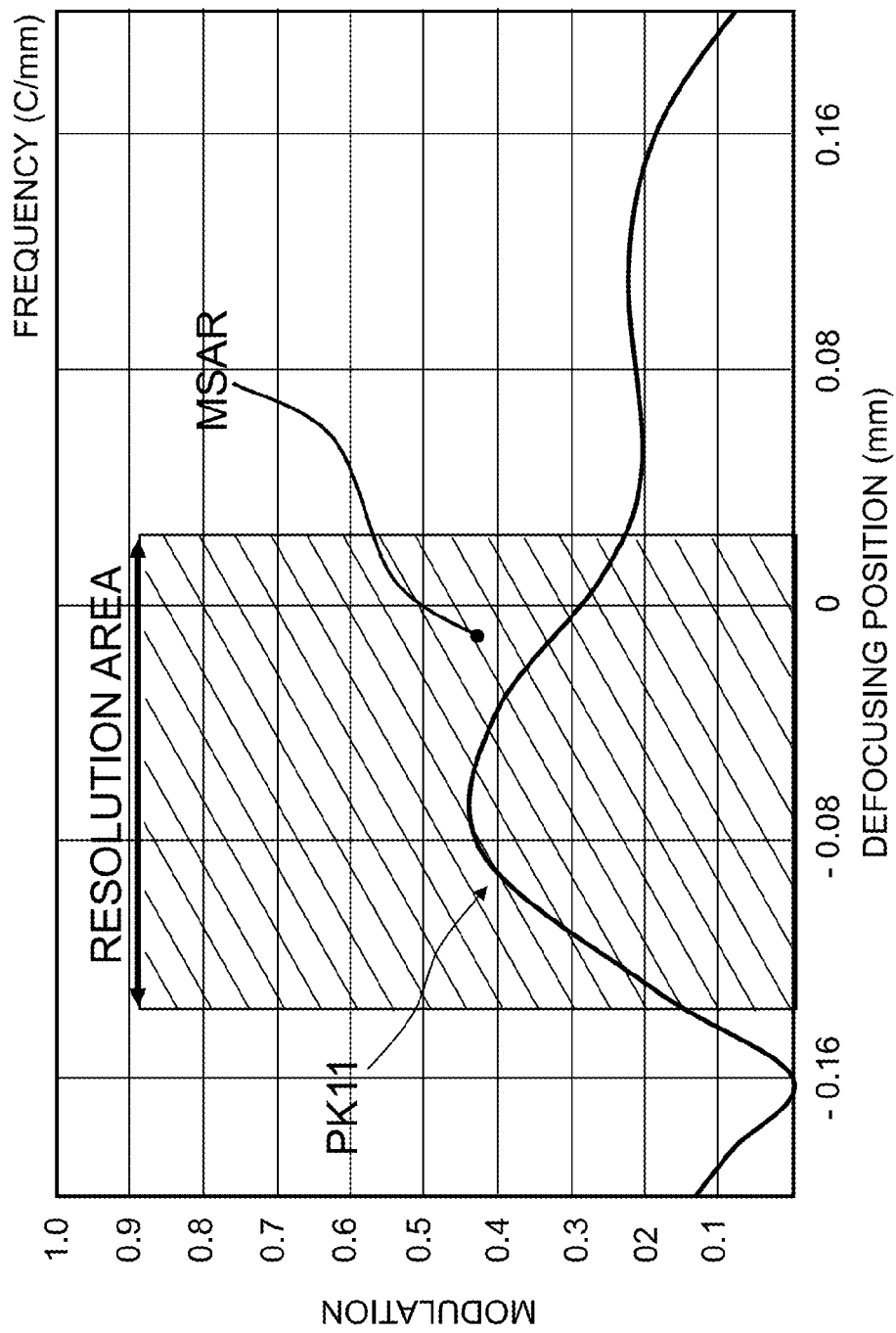
FIG. 15B is an illustration of the peak of an MTF in a principal-image-plane shift area MSAR at a low frequency.
Figure 15C:
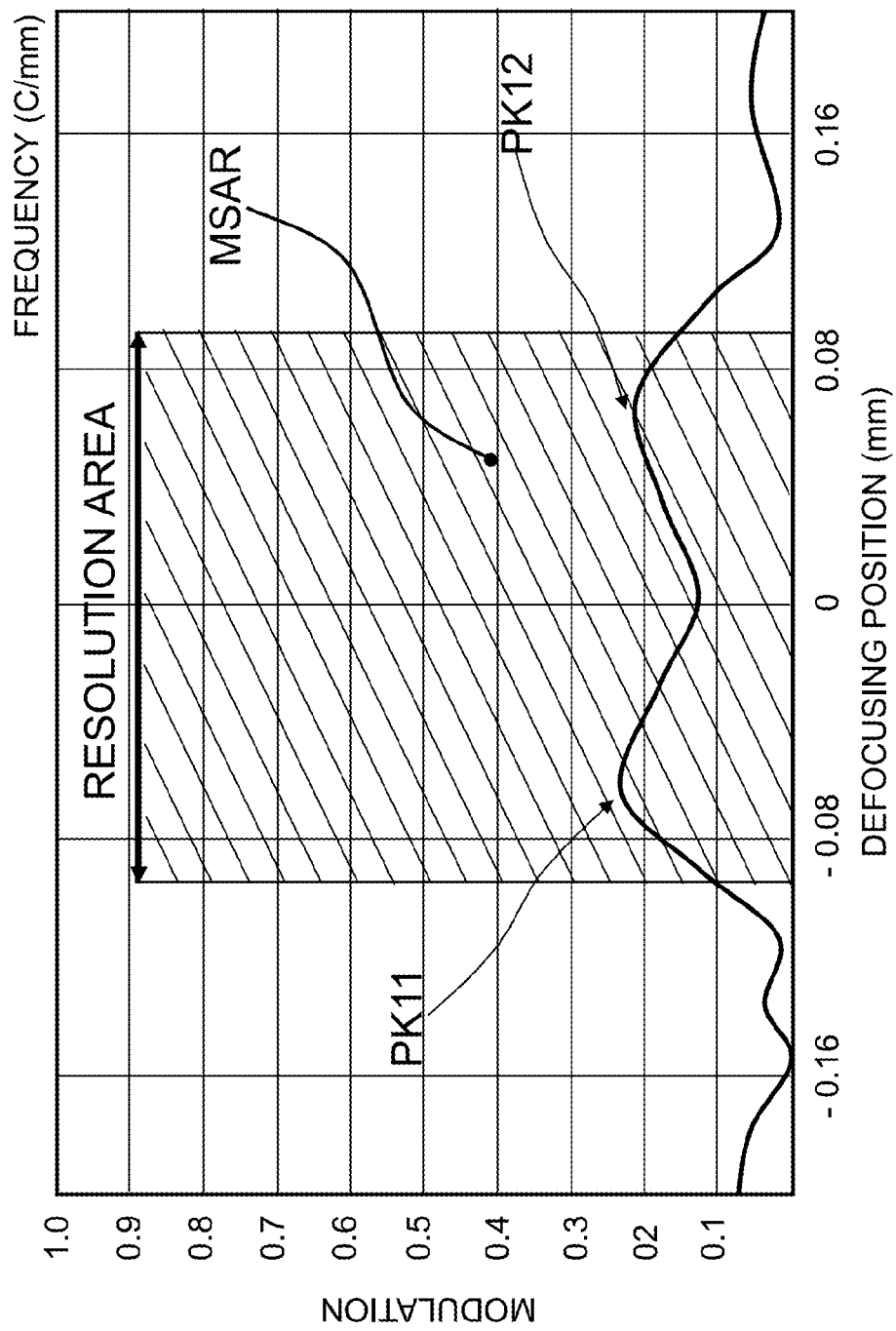
FIG. 15C is an illustration of the peak of an MTF in a principal-image-plane shift area MSAR at a high frequency.

FIGS. 15A to 15C and FIGS. 16A to 16C show that two peaks can be given to the MTF for defocusing at an arbitrary frequency by a spherical aberration curve in the aberration control optical system according to an embodiment. FIGS. 15A to 15C show that two peaks can be given to the MTF for defocusing at an arbitrary frequency in the aberration control optical system in which the change in OTF at a high frequency is limited. FIG. 15A shows a spherical aberration curve, FIG. 15B shows the peak of the MTF in the principal-image-plane shift area MSAR at a low frequency, and FIG. 15C shows the peak of the MTF in the principal-image-plane shift area MSAR at a high frequency.

Figure 16B:
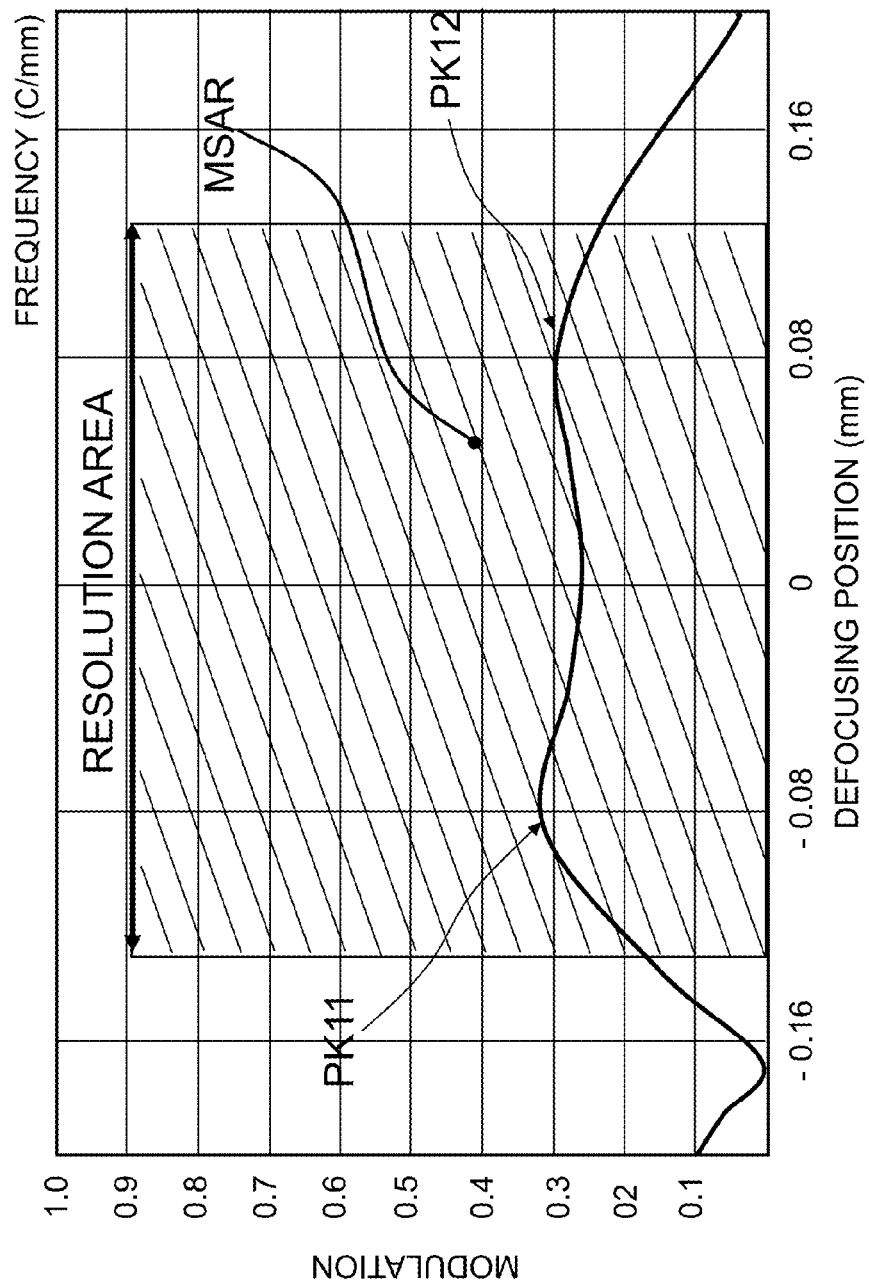
FIG. 16B is an illustration of a peak of an MTF in a principal-image-plane shift area MSAR at a low frequency.
Figure 16C:
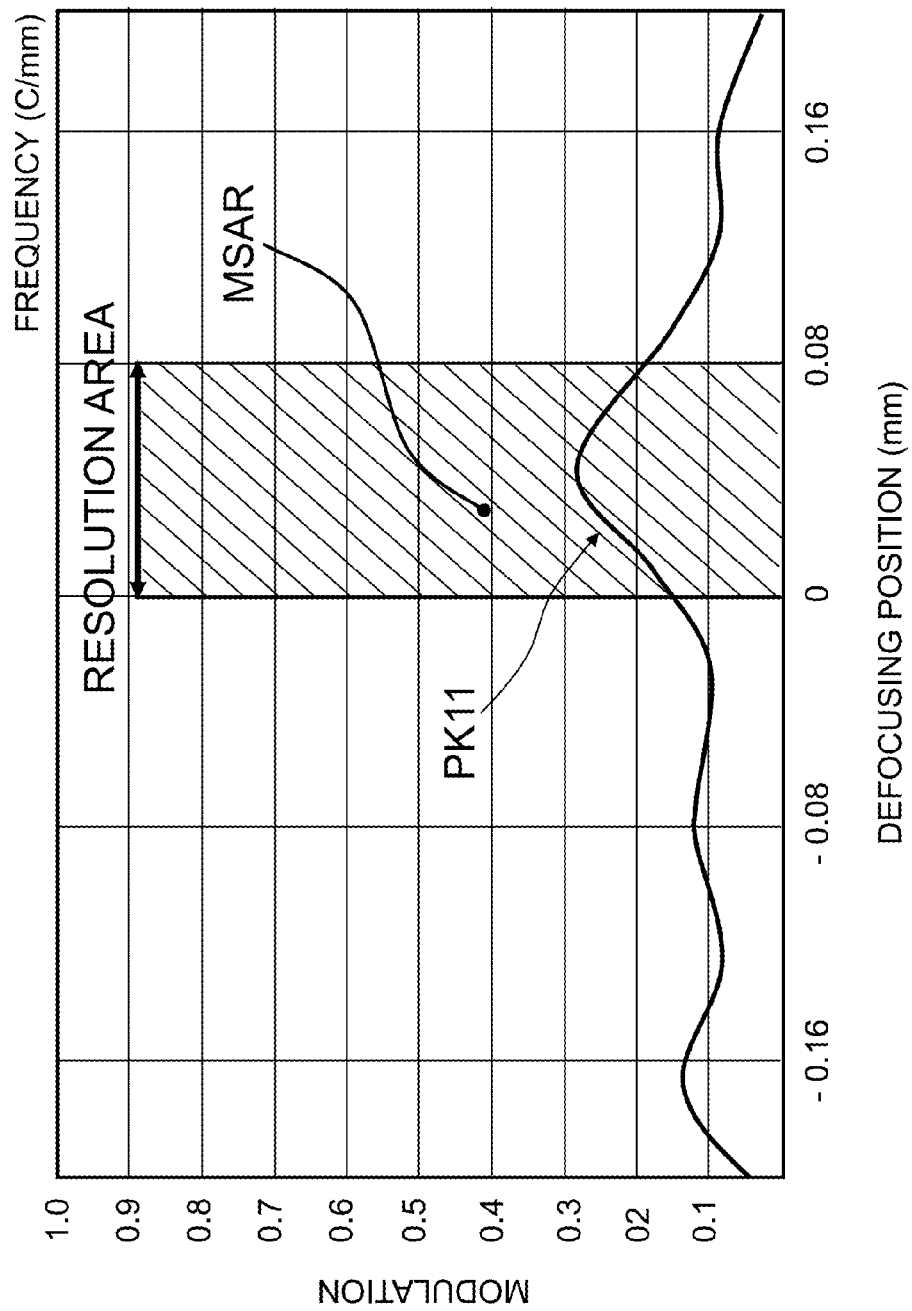
FIG. 16C is an illustration of a peak of an MTF in a principal-image-plane shift area MSAR at a high frequency.

FIGS. 16A to 16C show that two peaks can be given to the MTF for defocusing at an arbitrary frequency in the aberration control optical system in which the change in OTF at a low frequency is limited. FIG. 16A shows a spherical aberration curve, FIG. 16B shows the peak of the MTF in the principal-image-plane shift area MSAR at a low frequency, and FIG. 16C shows the peak of the MTF in the principal-image-plane shift area MSAR at a high frequency.

As shown in FIGS. 16A to 16C, in order to extend the depth at the low frequency, it is only necessary to increase the amplitude of spherical aberration. By controlling the amplitude, two peaks can be given to the defocusing MTF at an arbitrary frequency. That is, the depth at an arbitrary frequency can be extended. In an embodiment, the low frequency and the high frequency for defocusing.

The high frequency refers to a frequency more than or equal to half a Nyquist frequency that is determined by the pixel pitch of the used solid image pickup device (image pickup device 220), and the low frequency refers to a frequency less than half the Nyquist frequency.

The Nyquist frequency is defined as follows:

Nyquist frequency=1/(pixel pitch of solid image pickup device×2)

Figure 17B:
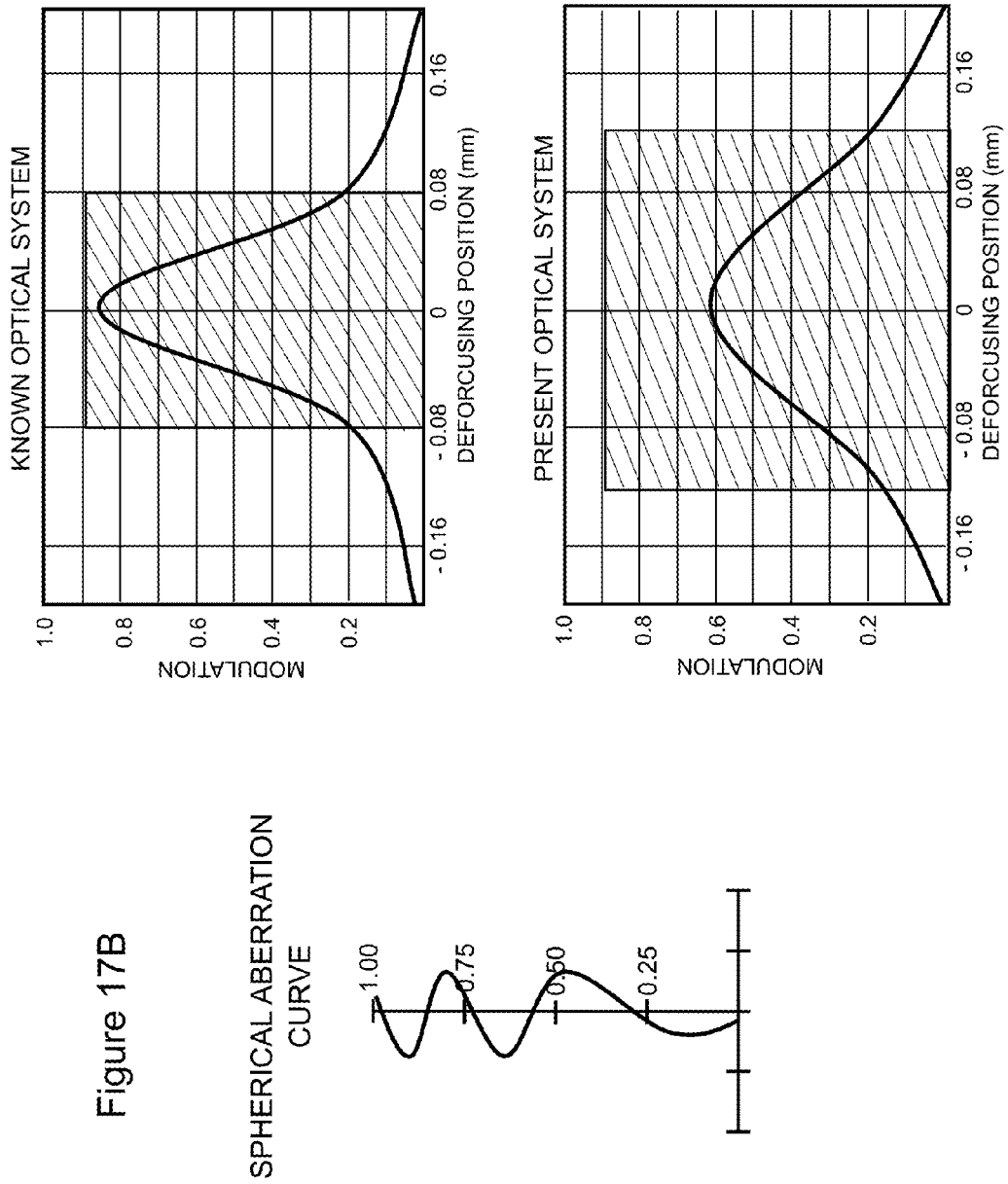
FIG. 17B is an illustration of spherical aberration and defocusing MTF based on an aperture diameter and depths in an optical system according to an embodiment of the present invention and a normal optical system in a state in which an aperture stop is closed halfway.
Figure 17C:
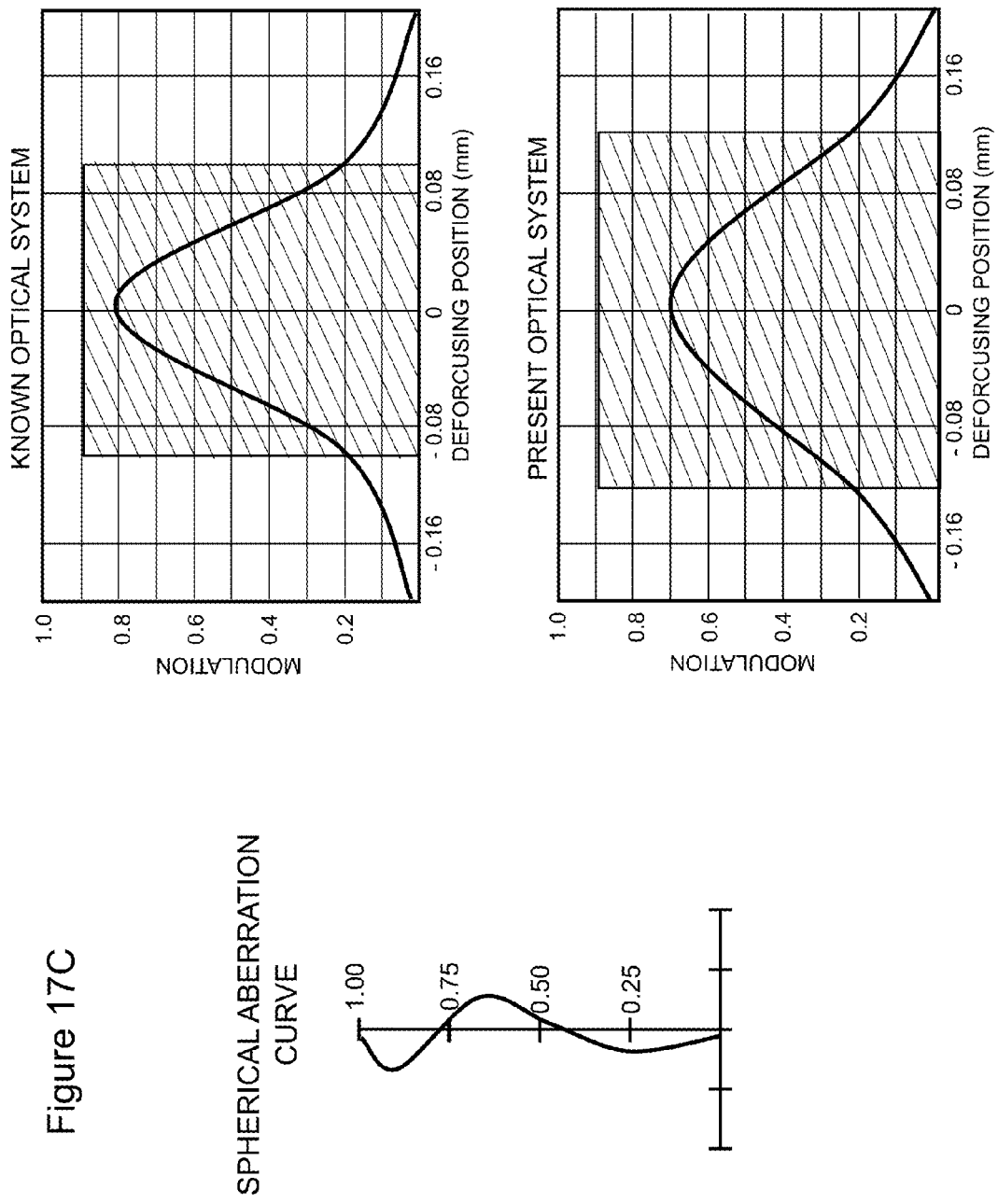
FIG. 17C is an illustration of spherical aberration and defocusing MTF based on an aperture diameter and depths in an optical system according to an embodiment of the present invention and a normal optical system in a state in which an aperture stop is closed.

FIGS. 17A to 17C comparatively show the differences in spherical aberration and defocusing MTF based on the aperture diameter and the depths, in the optical system according to an embodiment of the invention, and same in a normal (known) optical system. FIG. 17A shows a state in which the aperture stop is opened, FIG. 17B shows a state in which the aperture stop is closed halfway, and FIG. 17C shows a state in which the aperture stop is closed.

As shown in FIG. 17A the aperture stop is maximally opened, and the light beam passes through the aberration control surface having a plurality of inflection points near the aperture stop. A spherical aberration curve therefore also has a plurality of inflection points. Even when the aperture stop is closed from the state shown in FIG. 17A, the depth extending function can be maintained until at least one inflection point remains, as shown in FIGS. 17B and 17C.

The spherical aberration curve may have at least two inflection points. When the number of inflection points is two or less, distribution of inflection point areas with respect to the image height is not uniform. This causes a phenomenon that the peak position differs according to the frequency during depth extension.

In this case, since the ratio of frequency components of the PSF differs according to the object distance, it may be necessary to perform image processing in accordance with the lens characteristic corresponding to the object distance.

Accordingly, depth extension can be realized with well-balanced frequency control by forming three or more inflection points in the spherical aberration curve to give a plurality of peaks to the defocusing MTF and gradually increasing the amplitude of the spherical aberration curve from the center portion toward the peripheral portion.

Figure 18A:
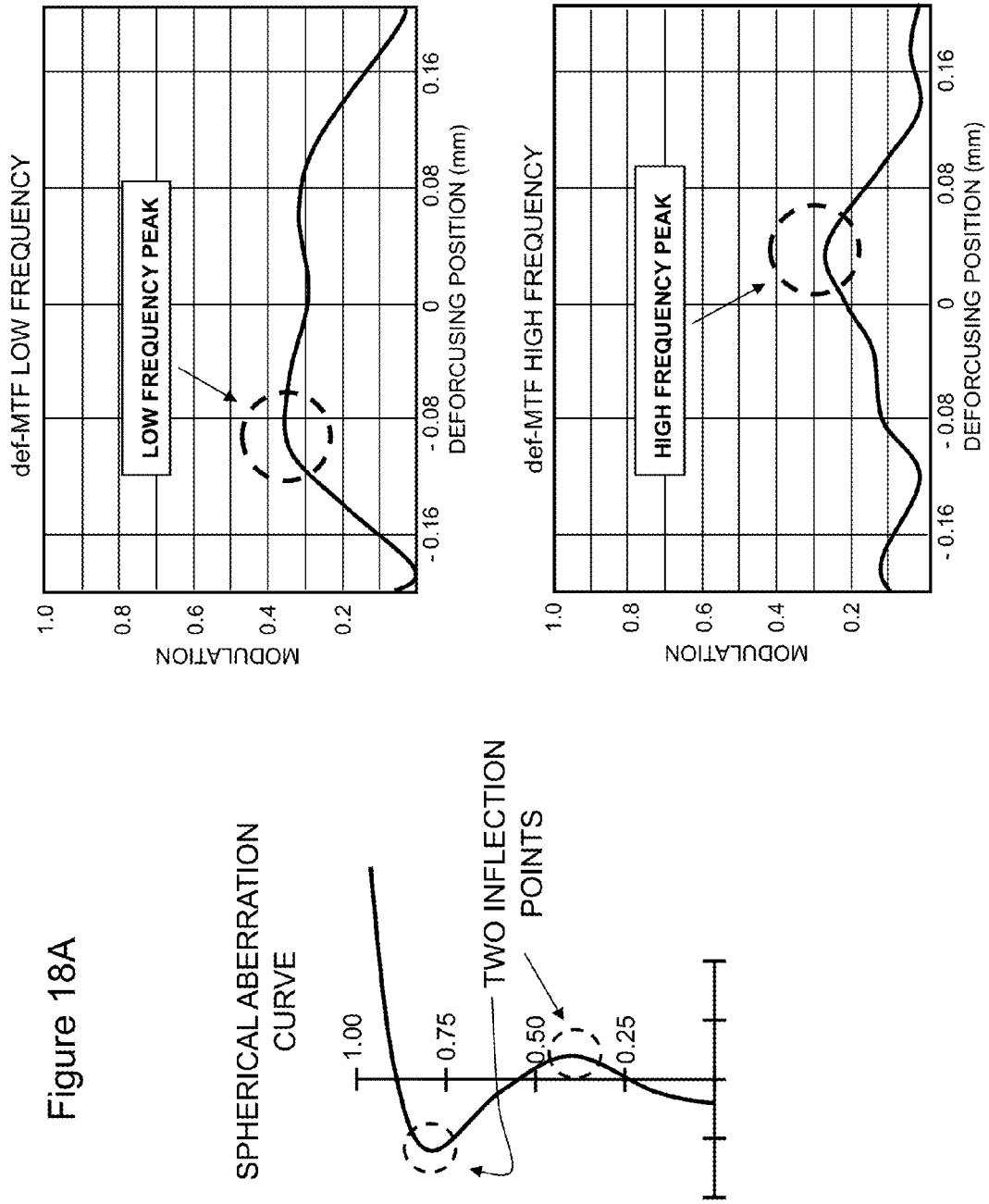
FIG. 18A is an illustration of spherical aberration and defocusing MTF based on a number of inflection points in a spherical aberration curves with two inflection points.
Figure 18B:
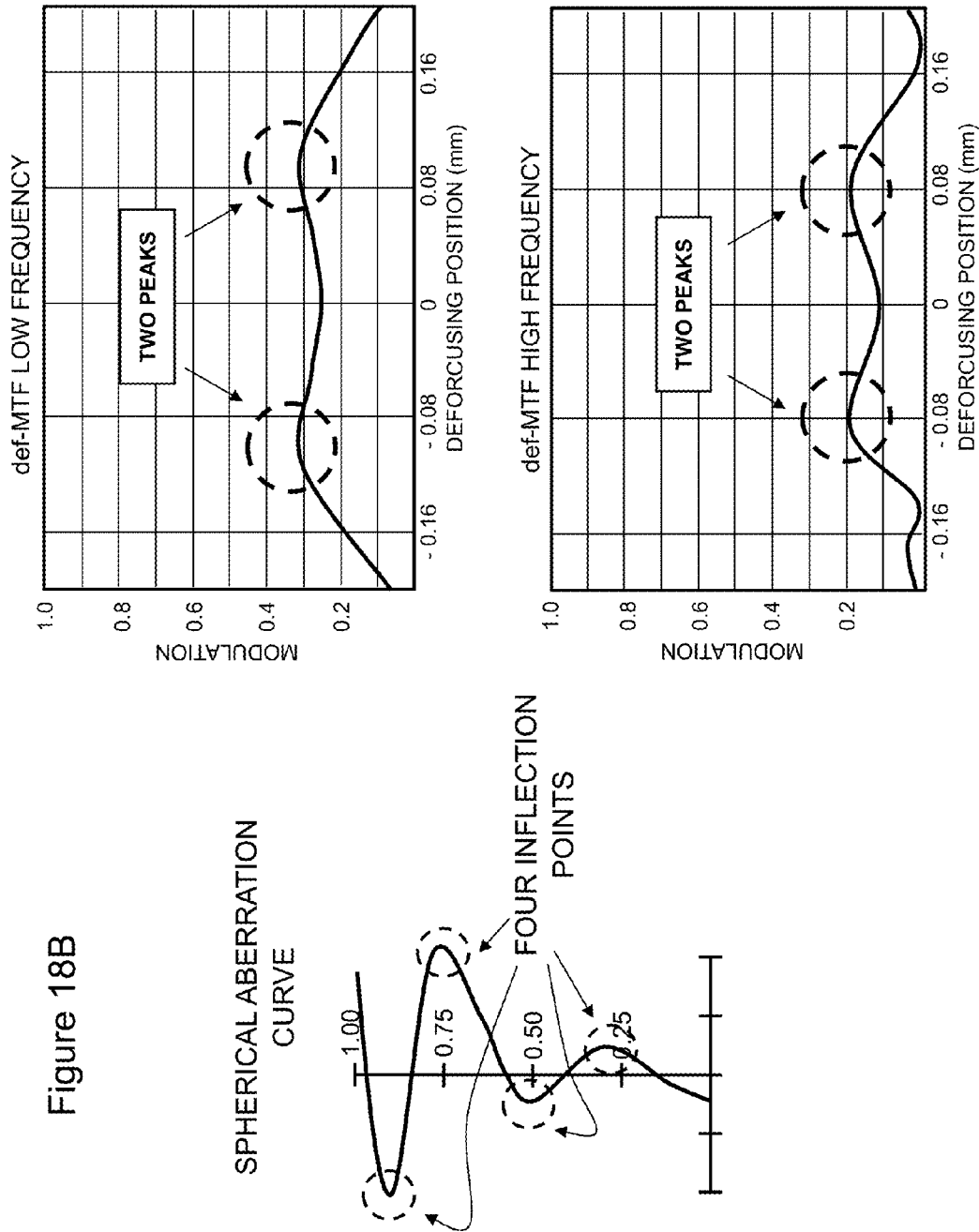
FIG. 18B is an illustration of spherical aberration and defocusing MTF based on a number of inflection points in a spherical aberration curves with four inflection points.

FIGS. 18A and 18B comparatively show differences in spherical aberration and defocusing MTF according to the number of inflection points in the spherical aberration curves. FIG. 18A shows a case in which there are two inflection points, and FIG. 18B shows a case in which there are four inflection points. As shown in FIG. 18A, when there are two inflection points, the peak position differs between the high frequency and the low frequency.

In contrast, as shown in FIG. 18B, when four inflection points are arranged with appropriate amplitudes, the peak positions do not change, regardless of the frequency. That is, when there are four inflection points, depth extension can be realized with well-balanced frequency control.

Figure 19A:
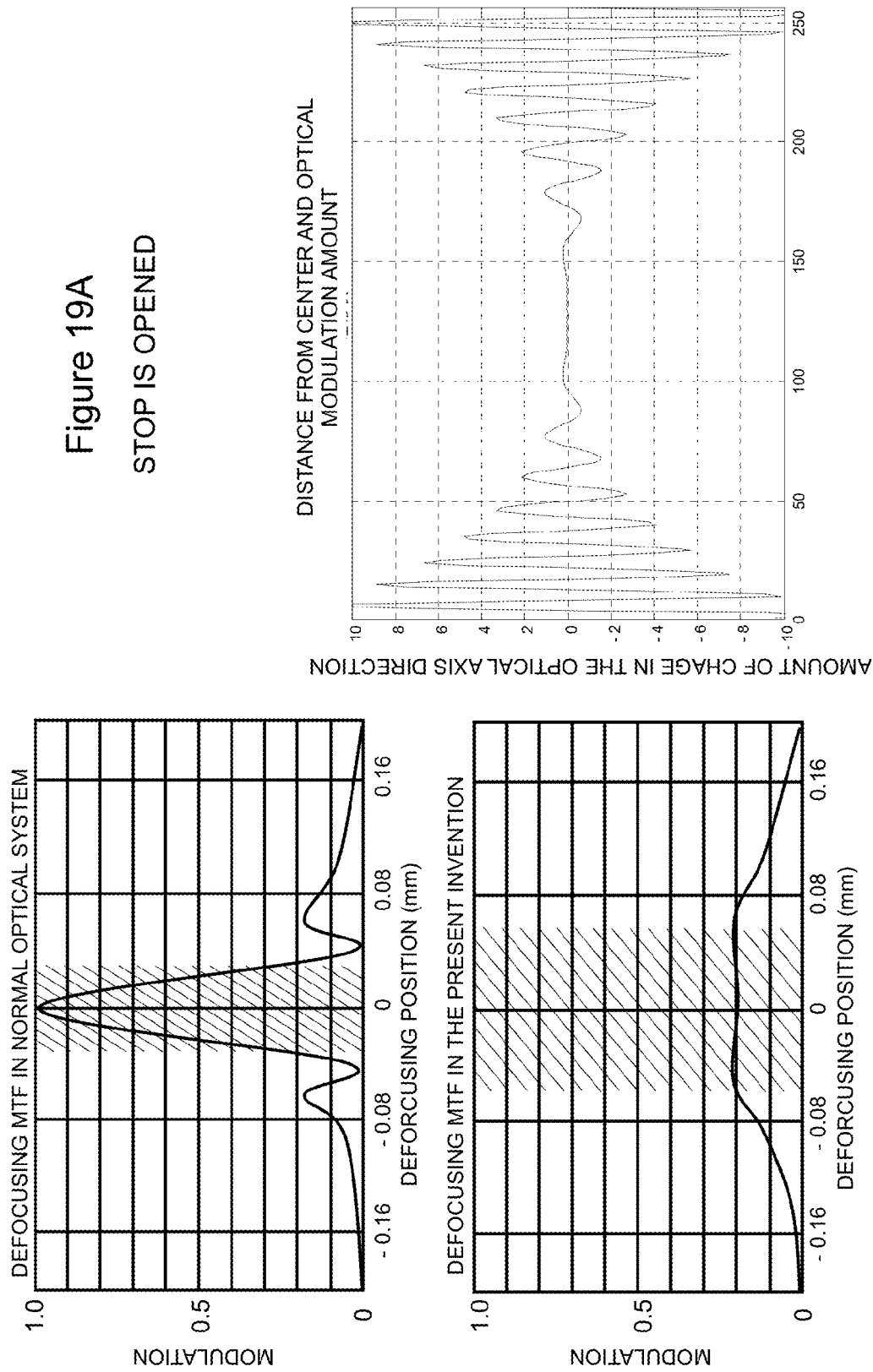
FIG. 19A is an illustration of MTF in a normal optical system and an aberration control optical system in states in which a variable aperture stop is opened.
Figure 19B:
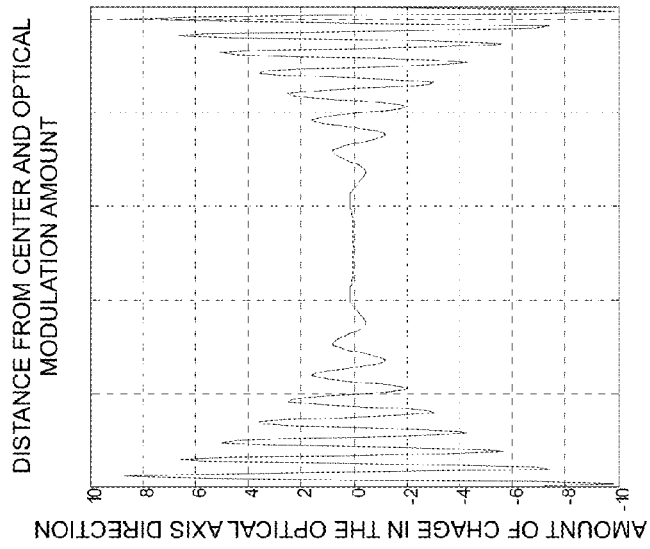
FIG. 19B is an illustration of MTF in a normal optical system and an aberration control optical system in states in which the variable aperture stop is half-closed.

FIGS. 19A to 19C comparatively show differences in MTF according to the aperture diameter between the normal optical system and the aberration control optical system according to one embodiment. FIG. 19A shows a state in which the variable aperture stop 214 is opened, FIG. 19B shows a state in which the variable aperture stop 214 is closed halfway, and FIG. 19C shows a state in which the variable aperture stop 214 is closed. In FIGS. 19A to 19C, hatched portions represent depth areas.

In other words, FIGS. 19A to 19C show relationships between aberration amounts and depths which are generated in the pupil surface of an optical system. FIG. 19A is extracted and shows the relation between the amount of the aberration at the time of opening, and the amount of escapes of depth.

Figure 19B:
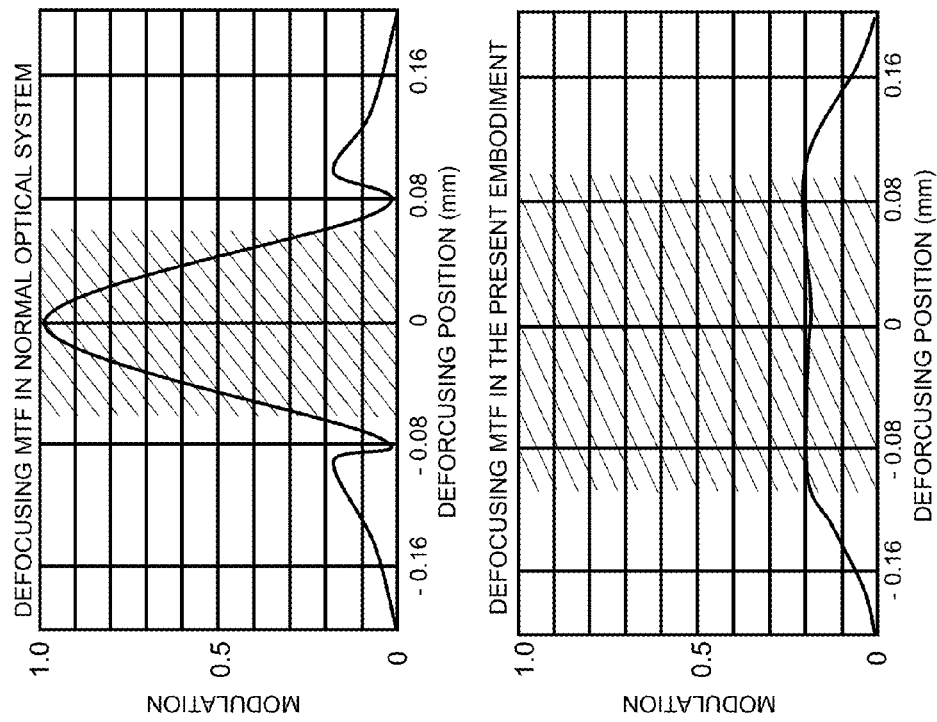

"DISTANCE FROM CENTER AND OPTICAL MODULATION AMOUNT" in FIG. 19 shows the aberration on a pupil surface. The y-axis shows an yield of phase modulations (i.e., an amount of an aberration) and x-axis shows a diameter of the pupil surface. In addition, the y-axis serves as a graph normalized to 10.

FIG. 19A shows the relationship when the aperture stop is opened (i.e., the path of a pupil surface is the largest), FIG. 19B shows the relationship when the aperture stop is closed halfway (i.e., the path of a pupil surface is smaller than that when the aperture stop is opened. FIG. 19C shows the relationship when the aperture stop is closed (i.e., the path of a pupil surface is the smallest).

A depth extension is dependent on the amount of the aberration on the pupil surface. In this embodiment, amounts of the aberration are shown in FIGS. 19A to 19C when it is assumed that depth is extended to be approximately doubled.

In order to lengthen depth 1.5 times, the amount of an aberration needs to be ten. Thus, if the amount of an aberration on the pupil surface is fixed or constant, the aberration is insufficient when the aperture stop is closed, and therefore, the enough depth extending effect can not be achieved.

In contrast, in an embodiment of the present invention, since the amount of an aberration is controlled, depending on the state of the aperture stop, the more aberration can occur when the aperture stop is closed.

As shown in FIGS. 19A to 19C, to maintain an equivalent level of depth extending effect, regardless of the selected f-number (aperture diameter), it is preferable that the optical modulation amount at the same position apart from the center portion increase as the aperture diameter decreases.

The characteristic structures, functions, and effects of the optical system according to one embodiment have been described above. Structures and functions of other components, such as the image pickup device and the image processing apparatus, will be described below.

In the image pickup device 220 such as a CCD or CMOS sensor, for example, as shown in FIG. 6, a plane parallel plate (cover glass) 221 made of glass and an image pickup surface 222 of the image pickup device 220 are arranged in that order from a side close to the fifth lens 216. Light from the object OBJ is focused onto the image pickup surface 222 of the image pickup device 220 via the aberration control optical system 210. A dispersed object image captured at the image pickup device 220 is not focused on the image pickup device 220 because of the aberration control optical surface 213a, and comprises a light beam having a large depth and a blurred portion.

Referring to FIG. 5, the image pickup device 220 may comprise a CCD or a CMOS sensor on which the image received from the aberration control optical system 210 is formed and which outputs first image information representing the image formed thereon to the image processing module 240 via the AFE module 230 as a first image electric signal (FIM).

The AFE module 230 may comprise a timing controller 231 and an analog/digital (A/D) converter 232. The timing controller 231 controls timing for driving the CCD in the image pickup device 220. The A/D converter 232 converts an analog signal input from the CCD into a digital signal, and can output the thus-obtained digital signal to the image processing module 240.

The image processing module 240 can receive the digital signal representing the picked-up image from the AFE module 230, subject the signal to a image processing process such as edge enhancement process and the like, improve the contrast which is lowered by the aberration control optical system 210, and output the result to the camera signal processing module 250 (e.g., a digital signal processor (DSP)).

The camera signal processing module (e.g., digital signal processor (DSP)) 250 is operable to perform processes, such as but without limitation, color interpolation, white balancing, YCbCr conversion, compression, filing, an the like, stores data in the image display memory 260, and displays images on the image monitoring module 270.

The control module 290 is operable to perform exposure control, receive operation inputs from the operation module 280 and the like, and determine the overall operation of the system on the basis of the received operation inputs. Thus, the control module 290 can control the AFE module 230, the image processing module 240, the camera signal processing module 250, the variable aperture stop 214 and the like, so as to perform aberration control of the overall system.

Configurations and functions of the optical system and the image processing apparatus according to one embodiment will be specifically described below. The embodiment employing the aberration control optical system obtains high-definition images, simplifies the optical system, and reduces the cost.

As described above, the image processing module 240 receives a primary image FIM captured by the image pickup device 220, subjects the image to image processing, such as edge emphasis, and increases the contrast lowered by aberration of the aberration control optical system 210, thus forming a high-definition final image FNLIM.

The image processing module 240 corrects the MTF of the primary image FIM, which is substantially low, as shown by a curve A in FIG. 20, by later processing, such as edge emphasis and chroma emphasis, using the spatial frequency as a parameter, and thereby causes the MTF to approach (reach) a characteristic shown by a curve B in FIG. 20.

Figure 20:
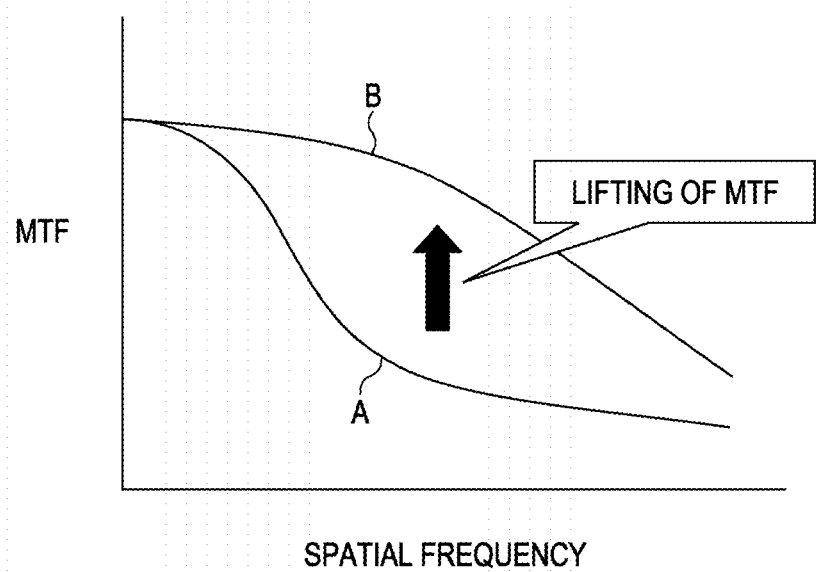
FIG. 20 is an illustration of an exemplary diagram of a modulation transfer function (MTF) correction process performed by an image processing device according to an embodiment of the present invention.

The characteristic shown by the curve B in FIG. 20 is obtained when the wavefront is not deformed, unlike the embodiment using the aberration control surface or the aberration control element. In this embodiment, correcting operations use the spatial frequency as a parameter.

Figure 21:
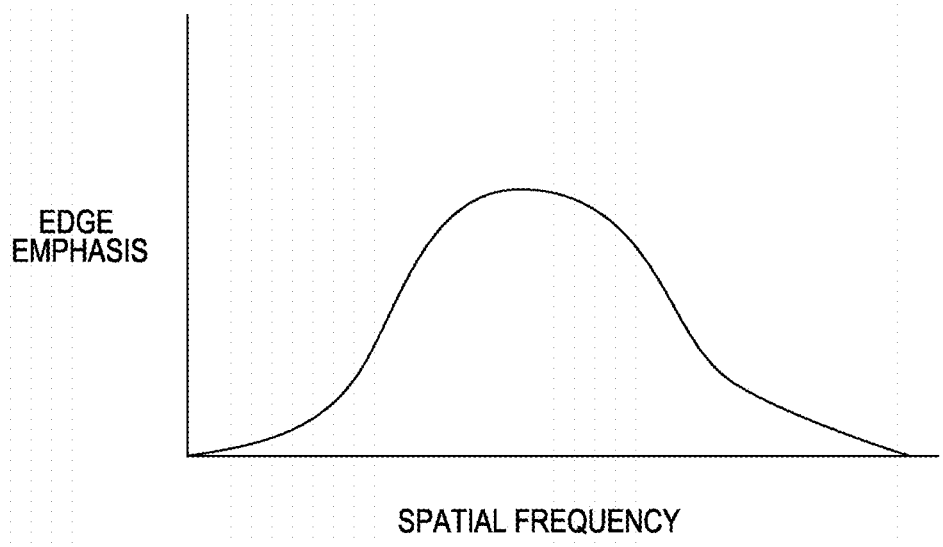
FIG. 21 is an illustration of an exemplary diagram of an MTF correction process performed by an image processing device according to an embodiment of the present invention.

To cause the MTF characteristic curve A corresponding to the optically obtained spatial frequency to finally reach the desired MTF characteristic curve B, as shown in FIG. 20, the original image (primary image) is corrected by changing the degree of edge emphasis for the spatial frequencies, as shown in FIG. 21.

For example, FIG. 21 shows the curve of edge emphasis corresponding to the spatial frequency for the MTF characteristic shown in FIG. 20. In other words, the desired MTF characteristic curve B is virtually realized by making correction to decrease the degree of edge emphasis on the low-frequency side and the high-frequency side in a predetermined range of the spatial frequency and to increase the degree of edge emphasis in an intermediate frequency range.

In this way, the image pickup apparatus 200 is an image forming system that comprises the aberration control optical system 210 and the image pickup device 220 for forming a primary image, and the image processing module 240 for forming a high-definition final image from the primary image. By adding, in the optical system, an aberration control element or a surface of an optical element formed of glass, plastic, or the like for aberration control, spherical aberration is intentionally produced to deform (modulate) the imaging wavefront. Such a wavefront is focused onto the image pickup surface (light receiving surface) of the image pickup device 220, such as a CCD or a CMOS sensor, and the focused primary image is processed by the image processing module 240 to obtain a high-definition image.

In an embodiment, the primary image taken by the image pickup image 220 has a light beam condition where the depth is quite large. For this reason, the MTF of the primary image is essentially low, and is corrected by the image processing module 240.

Figure 22:
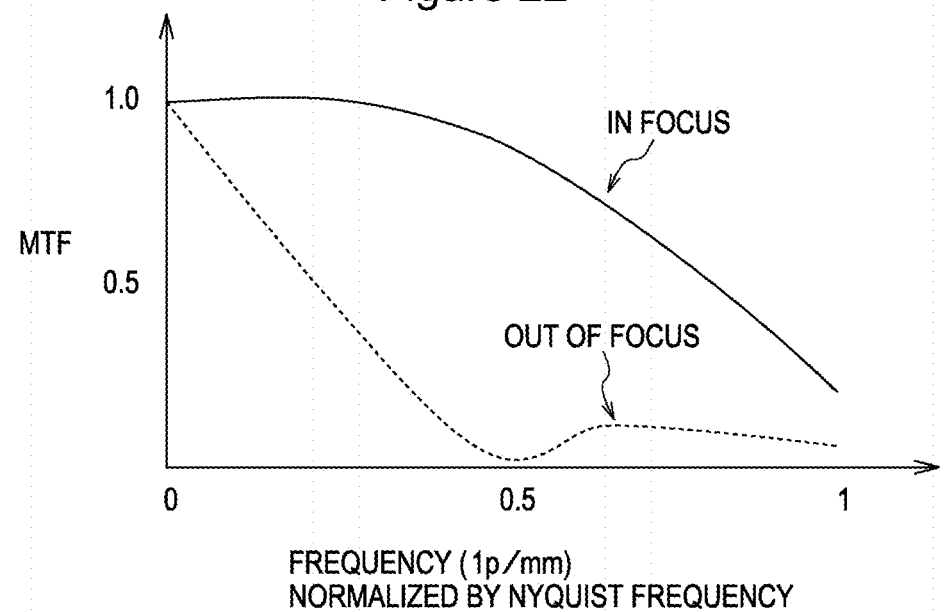
FIG. 22 is an illustration of an exemplary diagram showing an MTF response obtained when an object is in focus and when the object is out of focus in a typical optical system.
Figure 23:
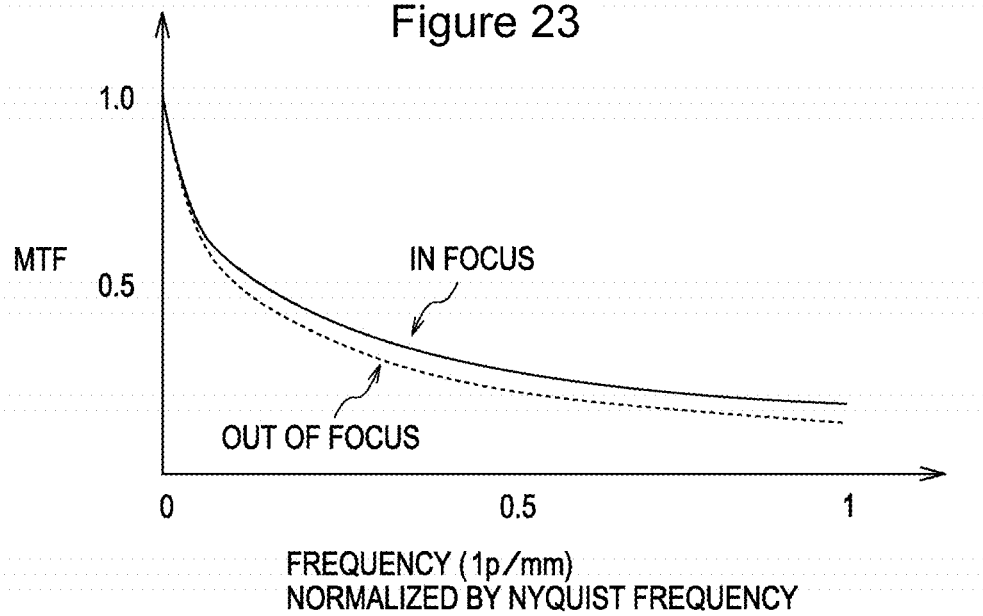
FIG. 23 is an illustration of an exemplary diagram showing an MTF response obtained when an object is in focus and when the object is out of focus in an optical system comprising an aberration controller according to an embodiment of the present invention.

FIG. 22 is an illustration of the responses of the MTF when the object is in focus and out of focus in the normal optical system. FIG. 23 is an illustration of the responses of the MTF when the object is in focus and out of focus in the optical system according to one embodiment including the aberration control element.

FIG. 24 is an illustration of the response of the MTF after image processing is performed in the image pickup apparatus 200 according to one embodiment.

As discussed above, in the optical system comprising the aberration control surface or the aberration control element, even when the object is out of focus, the change in response of the MTF is smaller than in the optical system in which the aberration control surface or the aberration control element is not inserted. By subjecting the image formed by the optical system to image processing by the subsequent image processing module 240, the response of the MTF can be improved. However, if image processing for increasing the response of the MTF increases noise, it may be omitted.

As described above, the optical system for intentionally producing aberration in accordance with the purpose is referred to as an aberration control optical system. Preferably, the absolute value (MTF) of the OTF of the aberration control optical system shown in FIG. 22 is about 0.1 or more at the Nyquist frequency.

To attain the OTF after restoration shown in FIG. 23, the gain is increased by image processing, but noise of the sensor is also increased. For this reason, it is preferable to perform image processing at the high frequency near the Nyquist frequency while minimizing increasing the gain. In the normal optical system, resolution is achieved as long as the MTF at the Nyquist frequency is about 0.1 or more.

Hence, when the MTF is about 0.1 or more before image processing, it is unnecessary to increase the gain at the Nyquist frequency by image processing. When the MTF is less than about 0.1 before image processing, the processed image is extensively affected by noise.

As described above, the image pickup apparatus 200 comprises the variable aperture stop 214, the aberration control optical system 210 comprising the aberration control function of intentionally producing aberration, the image pickup device 220, and the image processing module 240 for forming a high-definition final image from a primary image. The aberration control optical system 210A maintains the depth extending effect (function) even when the aperture diameter of the variable aperture stop 214 changes.

By changing the aperture diameter of the variable aperture stop 214, the aberration control optical system 210A can select from f-numbers. The aberration control optical system 210A has an aberration characteristic that at least two inflection points are provided within the effective diameter of the variable aperture stop 214.

The aberration control optical system 210 has an aberration characteristic that allows at least one inflection point in the region obtained by subtracting the region where the light beam passes when the aperture diameter of the variable aperture stop 214 is the smallest to attain the depth extending effect of the aberration control function, from the region where the light beam passes when the variable aperture stop 214 is opened.

That is, in the aberration control optical system 210A, at least one inflection point is provided between the region of the aberration control surface where the light beam passes corresponding to the smallest one of the f-numbers that are expected to serve the depth extending function, and the region of the aberration control surface where the light beam passes corresponding to the largest f-number.

According to an embodiment, therefore, selection from a plurality of f-numbers can be made by changing the aperture diameter of the variable aperture stop 214. Whichever f-number is selected, depth extension can be performed by the effect of the aberration control element or the aberration control surface.

Further, depth extension can be realized in accordance with the selection from an aperture diameter by properly providing spherical aberration with at least two inflection points.

In addition, the depth extending effect can be efficiently obtained even when the f-number changes.

In other words, according to an embodiment, it is possible to achieve depth extension without image restoration and to prevent the depth extending function from being impaired when the aperture diameter changes.

The aberration control optical system 210A serves as the depth extending optical system which uses the aberration control optical system 210A. The aberration control system comprises the aberration control element having the aberration control function which intentionally produces aberration. Or, the aberration control system 210A comprises the aberration control surface having the aberration control function so as to form a PSF extending over two or more pixels and in which the defocusing MTF has at least two peaks within the principle-image-plane shift area. In the principle-image-plane shift area spurious resolution does not occur at a predetermined frequency. This provides the following advantages.

Since the defocusing MTF is given at least two peaks by using the aberration control function in the embodiment, it is possible to minimize the decrease in peak value and to make the depth larger than in the normal optical system having no aberration control element. That is, depth extension can be performed without image restoration by properly controlling spherical aberration. This achieves an image of desirable quality that is rarely affected by noise.

By forming three or more inflection points in the spherical aberration curve, the defocusing MTF can have a plurality of peaks. Moreover, by gradually increasing the amplitude of the spherical aberration curve from the center portion toward the peripheral portion, depth extension can be realized with well-balanced frequency control.

In addition, a natural image can be obtained without using an expensive and large optical lens that is difficult to produce and without driving the lens. The image pickup apparatus 200 according to one embodiment can be used in an optical system, which needs to be small, light, and inexpensive, in a consumer apparatus such as a digital camera or a cam coder.

Further, it is possible to simplify the configuration of the aberration control optical system 210, to facilitate production, and to achieve cost reduction. The image pickup apparatus 200 according to one embodiment is applicable not only to the information reading apparatus, but also to, for example, a digital still camera, a video camera, a digital video unit, a personal computer, a mobile telephone, a PDA, an image inspection apparatus, and an automatic control industrial camera.

As described above, the image pickup apparatus 200 comprises the variable aperture stop 214, the aberration control optical system 210 having the aberration control function of intentionally producing aberration, the image pickup device 220, and the image processing module 240 for forming a high-definition final image from a primary image. The image pickup apparatus 200 can change the aberration control function of the aberration control optical system in response to the change in aperture diameter of the variable aperture stop 214.

In the aberration control optical system 210A according to one embodiment, the refractive index of spherical aberration has at least one inflection point within the aperture diameter of the variable aperture stop 214, regardless of the value of the aperture diameter. The difference in refractive index between the inflection point and the center portion of the optical axis OX increases from the center portion toward the peripheral portion. Further, the difference in the refractive index between the inflection point and the optical axis center portion increases as the aperture diameter of the variable aperture stop 214 decreases.

While at least one exemplary embodiment has been presented in the foregoing detailed description, the invention is not limited to the above-described embodiment or embodiments. Variations may be apparent to those skilled in the art. In carrying out the invention, various modifications, combinations, sub-combinations and alterations may occur in regard to the elements of the above-described embodiment insofar as they are within the technical scope of the invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the invention have been described with reference to the accompanying drawings, it is to be noted that changes and modifications may be apparent to those skilled in the art. Such changes and modifications are to be understood as being comprised within the scope of the invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An image pickup apparatus comprising:
an optical system comprising:
an aberration control optical system operable to produce aberration;
an aberration control section operable to extend a depth of a field;
a variable aperture stop operable to limit a light beam passing through the optical system, wherein the variable aperture stop has a variable aperture diameter; and
an image pickup device operable to capture an object image passing through the optical system,
wherein the aberration control optical system has a refractive index that is characterized by an aberration curve comprising a plurality of inflection points within the variable aperture diameter of the variable aperture stop to obtain a depth extending effect.

2. The image pickup apparatus according to claim 1, wherein a modulation transfer function (MTF) for defocusing of the optical system has a plurality of peaks in a principal-image-plane shift area at an arbitrary frequency.

3. The image pickup apparatus according to claim 1, wherein the aberration curve comprises a spherical aberration curve.

4. The image pickup apparatus according to claim 3, wherein the spherical aberration curve comprises at least three inflection points produced in an aperture of the variable aperture stop.

5. The image pickup apparatus according to claim 3, wherein amplitude of the spherical aberration curve gradually increases from a center portion toward a peripheral portion.

6. The image pickup apparatus according to claim 1, wherein the aberration control section is located adjacent to the variable aperture stop.

7. The image pickup apparatus according to claim 1, wherein the aberration control optical system has a depth extending function that is independent of the variable aperture diameter.

8. The image pickup apparatus according to claim 1, further comprising an image processing module operable to subject an image signal obtained by the image pickup device to image processing so as to enhance an image characteristic lowered by an aberration of the aberration control optical system.

9. The image pickup apparatus according to claim 1, further comprising a control module operable to change an aberration control function of the aberration control optical system.

10. The image pickup apparatus according to claim 9, wherein the aberration control function is variable.

11. The image pickup apparatus according to claim 10, wherein the control module is further operable to change the aberration control function in response to a change in the variable aperture diameter of the variable aperture stop.

12. The image pickup apparatus according to claim 11, wherein at least one of the plurality of inflection points is independent of a size of the variable aperture diameter.

13. The image pickup apparatus according to claim 12, wherein a difference in the refractive index between the at least one inflection point and an optical axis center portion increases from an optical center portion toward a periphery.

14. The image pickup apparatus according to claim 13, wherein the difference in the refractive index between the at least one inflection point and the optical axis center portion increases as the variable aperture diameter of the variable aperture stop decreases.

15. The image pickup apparatus according to claim 9, wherein the aberration control optical system comprises an externally dependent aberration control element in which a degree of performance of the aberration control function is externally dependent.

16. An electronic device comprising an image pickup apparatus, wherein the image pickup apparatus comprises:
    an aberration control optical system operable to produce an aberration;
    a variable aperture stop operable to limit a light beam passing through the optical system; and
    an image pickup device operable to capture an object image passing through the optical system,
    wherein the aberration control optical system has a refractive index that is characterized by an aberration curve comprising a plurality of inflection points within a variable aperture diameter of the variable aperture stop to obtain a depth extending effect.

17. An image aberration control method in an image pickup apparatus comprising an aberration control optical system, the image aberration control method comprises:
    limiting a light beam via a variable aperture stop passing through the aberration control optical system;
    producing an aberration in the aberration control optical system;
    capturing an object image passing through the aberration control optical system, and
    providing a plurality of inflection points on an aberration curve within a variable diameter of the variable aperture stop to obtain a depth extending effect.

* * * * *